United States Patent
Nose et al.

(10) Patent No.: US 10,337,475 B2
(45) Date of Patent: Jul. 2, 2019

(54) AIR INTAKE DEVICE OF ENGINE WITH SUPERCHARGER

(71) Applicant: MAZDA MOTOR CORPORATION, Hiroshima (JP)

(72) Inventors: Atsushi Nose, Higashihiroshima (JP); Noriaki Fujita, Hatsukaichi (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 121 days.

(21) Appl. No.: 15/512,818

(22) PCT Filed: Oct. 14, 2016

(86) PCT No.: PCT/JP2016/080611
§ 371 (c)(1),
(2) Date: Mar. 20, 2017

(87) PCT Pub. No.: WO2017/073378
PCT Pub. Date: May 4, 2017

(65) Prior Publication Data
US 2017/0292480 A1    Oct. 12, 2017

(30) Foreign Application Priority Data

Oct. 29, 2015 (JP) ................................ 2015-212740
Mar. 4, 2016 (JP) ................................ 2016-041999

(51) Int. Cl.
*F02B 29/04* (2006.01)
*F02M 35/10* (2006.01)
(Continued)

(52) U.S. Cl.
CPC ....... *F02M 35/10163* (2013.01); *F02B 29/04* (2013.01); *F02B 37/013* (2013.01);
(Continued)

(58) Field of Classification Search
CPC ......... F02M 35/10163; F02M 35/1272; F02M 35/1283; F02M 35/10144;
(Continued)

(56) References Cited

U.S. PATENT DOCUMENTS 5,718,461 A * 2/1998 Esser ................... B65G 53/523
                                                      285/179
6,385,967 B1 * 5/2002 Chen ....................... F01N 1/023
                                                      181/252

(Continued)

FOREIGN PATENT DOCUMENTS

| JP | S60-108754 U | 7/1985 |
|---|---|---|
| JP | 2001-263076 A | 9/2001 |
| JP | 2009-250183 A | 10/2009 |

OTHER PUBLICATIONS

International Search Report issued in PCT/JP2016/080611; dated Jan. 10, 2017.

*Primary Examiner* — Jacob M Amick
*Assistant Examiner* — Charles Brauch
(74) *Attorney, Agent, or Firm* — Studebaker & Brackett PC

(57) ABSTRACT

An air intake device includes a bypass passage which makes a portion of an air intake passage on an upstream side of a compressor and a portion of the air intake passage on a downstream side of the compressor communicate with each other, and a bypass passage open/close valve which opens or closes the bypass passage. The air intake passage includes a first passage extending toward an upstream side from the compressor along a first direction, a bent portion bent from an upstream end of the first passage in a second direction, and a second passage extending from an upstream end of the bent portion along the second direction. The second passage has a vertically elongated cross-sectional shape. A vibration suppressing part for suppressing vibrations of the second (Continued)

FRONT ←――――→ REAR passage is disposed in at least one of the second passage and the bent portion.

20 Claims, 17 Drawing Sheets

(51) Int. Cl.
*F02M 35/12* (2006.01)
*F02B 37/013* (2006.01)

(52) U.S. Cl.
CPC *F02M 35/10144* (2013.01); *F02M 35/10242* (2013.01); *F02M 35/1272* (2013.01); *F02M 35/1283* (2013.01); *F01P 2060/02* (2013.01); *F02M 35/10157* (2013.01); *F02M 2700/331* (2013.01); *Y02T 10/144* (2013.01); *Y02T 10/146* (2013.01)

(58) Field of Classification Search
CPC ......... F02M 35/10242; F02M 2700/33; F02M 35/10157; F02B 37/013; F02B 29/04; Y02T 10/146; Y02T 10/144; F01P 2060/02
See application file for complete search history.

(56) References Cited

U.S. PATENT DOCUMENTS

| | | |
|---|---|---|
| 2001/0022174 A1 | 9/2001 | Suzuki et al. |
| 2014/0328665 A1* | 11/2014 | Glugla .................. F02B 37/18 415/1 |
| 2015/0233329 A1* | 8/2015 | Morey ............. F02M 35/10242 123/184.53 |
| 2015/0252759 A1 | 9/2015 | Ostler et al. |

* cited by examiner

FRONT ← → REAR

LEFT ← → RIGHT

FRONT ←——→ REAR

REAR ←——————→ FRONT

AIR INTAKE DEVICE OF ENGINE WITH SUPERCHARGER

TECHNICAL FIELD

The present invention relates to an air intake device of an engine with a supercharger which includes an engine body, an air intake passage for introducing intake air into the engine body, and a turbo supercharger which includes a compressor disposed in the air intake passage and supercharges the intake air.

BACKGROUND ART

Conventionally, in an engine with a supercharger, to protect a compressor and the like, there has been provided a passage which makes a portion of the air intake passage on an upstream side of the compressor and a portion of the air intake passage on a downstream side of the compressor communicate with each other thus bypassing the compressor. That is, when an amount of air sucked into the inside of the engine body is decreased at the time of deceleration or the like, pressurized air existing between the compressor and the engine body flows backward thus giving rise to a possibility that the compressor or the like is damaged. Accordingly, there has been adopted a technique where air compressed by the compressor is leaked to an upstream side of the compressor from a downstream side of the compressor through the bypass passage at the time of deceleration or the like.

However, when the bypass passage is disposed in the air intake passage, for instance, a pressure wave is propagated to an upstream side of the air intake passage through the bypass passage thus giving rise to a possibility that noises are generated. In view of the above, for example, Patent Literature 1 discloses a device provided with a passage which makes the bypass passage and an exhaust passage communicate with each other. In such a device, the inflow of pressurized air toward an air intake passage side is suppressed by introducing a portion of the pressurized air into the exhaust passage at the time of deceleration or the like and hence, the inflow of the pressurized air into the air intake passage side is suppressed.

CITATION LIST

Patent Literature

PTL 1: Japanese Unexamined Patent Publication No. 2001-263076

SUMMARY OF INVENTION

In mounting the engine on a vehicle or the like, there has been a demand for the arrangement where various devices around the engine are arranged in a compact manner. To enable such compact arrangement of the devices, for example, there may be a case where an air intake passage has a middle portion thereof formed into a bent shape. However, in the engine with a supercharger which includes the bypass passage on the air intake passage for suppressing a damage on the compressor or the like, when the air intake passage is disposed by simply bending a portion of the air intake passage upstream of a connecting portion with the bypass passage, pressurized air discharged from the bypass passage impinges on the bent portion thus giving rise to a possibility that noises are increased.

The present invention has been made in view of the circumstances, and it is an object of the present invention to provide an air intake device of an engine with a supercharger which can suppress the increase of noises while enabling compact arrangement of an air intake passage.

According to the present invention, in order to solve the problems, there is provided an air intake device of an engine with a supercharger including: an engine body; an air intake passage which introduces intake air into the engine body; and a turbo supercharger which includes a compressor disposed in the air intake passage and supercharges the intake air, this air intake device further including: a bypass passage which makes a portion of the air intake passage on an upstream side of the compressor and a portion of the air intake passage on a downstream side of the compressor communicate with each other thus bypassing the compressor; and a bypass passage which open/close valve which opens or closes the bypass passage, wherein the air intake passage has an upstream-side pipe positioned upstream of the compressor, the upstream-side pipe includes a first passage extending toward an upstream side from the compressor along a first direction, a bent portion bent from an upstream end of the first passage in a second direction, which differs from the first direction, and a second passage extending from an upstream end of the bent portion along the second direction, the bypass passage is connected to a connecting portion mounted in the first passage, the second passage has a vertically elongated cross-sectional shape where a size of the second passage in a vertical direction is larger than a size of the second passage in a width direction, and a vibration suppressing part for suppressing vibrations of the second passage is disposed in at least one of the bent portion and the second passage.

According to the present invention, by providing the bypass passage which bypasses the compressor and the bypass passage open/close valve to the air intake device, it is possible to suppress the increase of noises caused by the bypass passage while suppressing a damage or the like on the compressor and disposing the air intake passage in a compact manner.

DESCRIPTION OF EMBODIMENTS (1) Entire Configuration of Engine System

Figure 1:
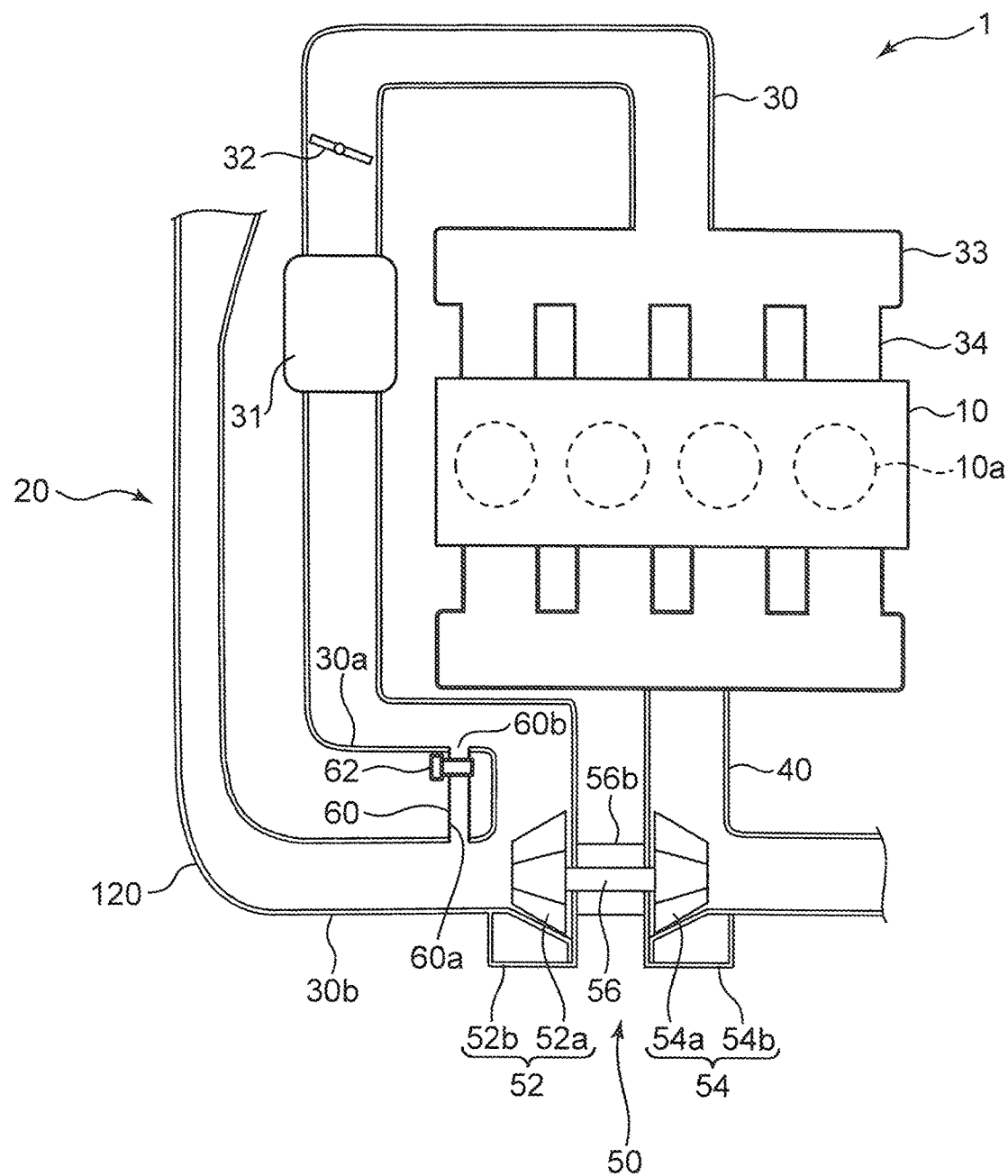
FIG. 1 is a schematic constitutional view of an engine system according to a first embodiment of the present invention.

FIG. 1 is a schematic constitutional view of an engine system (an engine with a supercharger) 1 provided with an air intake device according to a first embodiment of the present invention. The engine system 1 according to this embodiment is mounted on a vehicle. For example, the engine system 1 is disposed in the inside of an engine room formed in the vehicle.

The engine system 1 includes an engine body 10 having cylinders 10a and being configured such that an air-fuel mixture is combusted in the inside of the cylinder 10a, an air intake device 20 provided for introducing air (intake air) into the engine body 10, and an exhaust passage 40 provided for discharging an exhaust gas discharged from the engine body 10 to the outside. The air intake device 20 includes an air intake passage 30 which is connected to the engine body 10 and introduces intake air to the engine body 10 therethrough. For example, as shown in FIG. 1, as the engine body 10, an in-line 4-cylinder engine can be named. However, a specific configuration of the engine body is not limited to such a configuration.

The engine system 1 includes a turbo supercharger 50 having a compressor 52 mounted in the air intake passage 30 and a turbine 54 mounted in the exhaust passage 40. The turbo supercharger 50 is provided for supercharging intake air to be sucked into the engine body 10. The compressor 52 includes a compressor body 52a which has a plurality of blades formed on an outer peripheral portion thereof, and a compressor housing 52b which houses the compressor body 52a. The turbine 54 includes a turbine body 54a which has a plurality of blades formed on an outer peripheral portion thereof, and a turbine housing 54b which houses the turbine body 54a therein. The turbo supercharger 50 includes a rotary shaft 56 which connects the compressor body 52a and the turbine body 54a to each other. The turbo supercharger 50 is configured such that when the turbine body 54a is rotatably driven by an exhaust gas, the compressor body 52a is rotated along with the rotational driving of the turbine body 54a so that intake air is compressed and pressurized in the compressor housing 52b.

In a portion of the air intake passage 30 downstream of the compressor 52, an intercooler 31 which cools supercharged intake air, a throttle valve 32 which opens or closes the air intake passage 30, and a surge tank 33 are disposed in order from an upstream side. The air intake passage 30 is branched into independent passages 34 which are individually communicated with the respective cylinders 10a on a downstream side of the surge tank 33, and intake air is introduced into the engine body 10 through these independent passages 34.

The air intake device 20 includes, in addition to the air intake passage 30, a bypass passage 60, and an ABV (bypass passage open/close valve) 62 which opens or closes the bypass passage 60.

The bypass passage 60 makes an upstream-side connecting portion 60a (connecting portion) disposed upstream of the compressor 52 in the air intake passage 30 and a downstream-side connecting portion 60b positioned on a downstream side of the compressor 52 in the air intake passage 30 communicate with each other thus bypassing the compressor 52. When the ABV 62 is opened, a part of intake air existing between the compressor 52 and the engine body 10, that is, a part of high-pressure intake air after being supercharged by the compressor 52 flows into a portion of the air intake passage 30 upstream of the compressor 52 by passing through the bypass passage 60 without passing through the compressor 52.

The ABV 62 is driven by a control unit (not shown in the drawing) for driving various equipment of the engine system 1. In this embodiment, mainly to suppress applying of a damage to the compressor 52, when an amount of intake air sucked into the engine body 10 is decreased during deceleration of a vehicle or the like, the ABV 62 is opened. The ABV 62 is fully closed under other driving conditions.

That is, when an amount of intake air sucked into the engine body 10 is deceased, there is a possibility that a high-pressure intake air existing at a portion between the engine body 10 and the compressor 52 flows backward toward the compressor 52 side so that the compressor 52 or the like is damaged. Further, the throttle valve 32 is operated to be shifted toward a closing side so as to decrease an amount of intake air to be sucked into the engine body 10. However, when high-pressure intake air exists at the portion in a state where the throttle valve 32 is operated to be shifted toward a closing side as described above, there is a possibility that the throttle valve 32 is damaged due to such high-pressure intake air. Accordingly, in this embodiment, the ABV 62 is opened under an operation condition where an amount of intake air is decreased so that a part of high-pressure intake air is returned to an upstream side through the bypass passage 60.

(2) Arrangement around Engine Body

Figure 2:
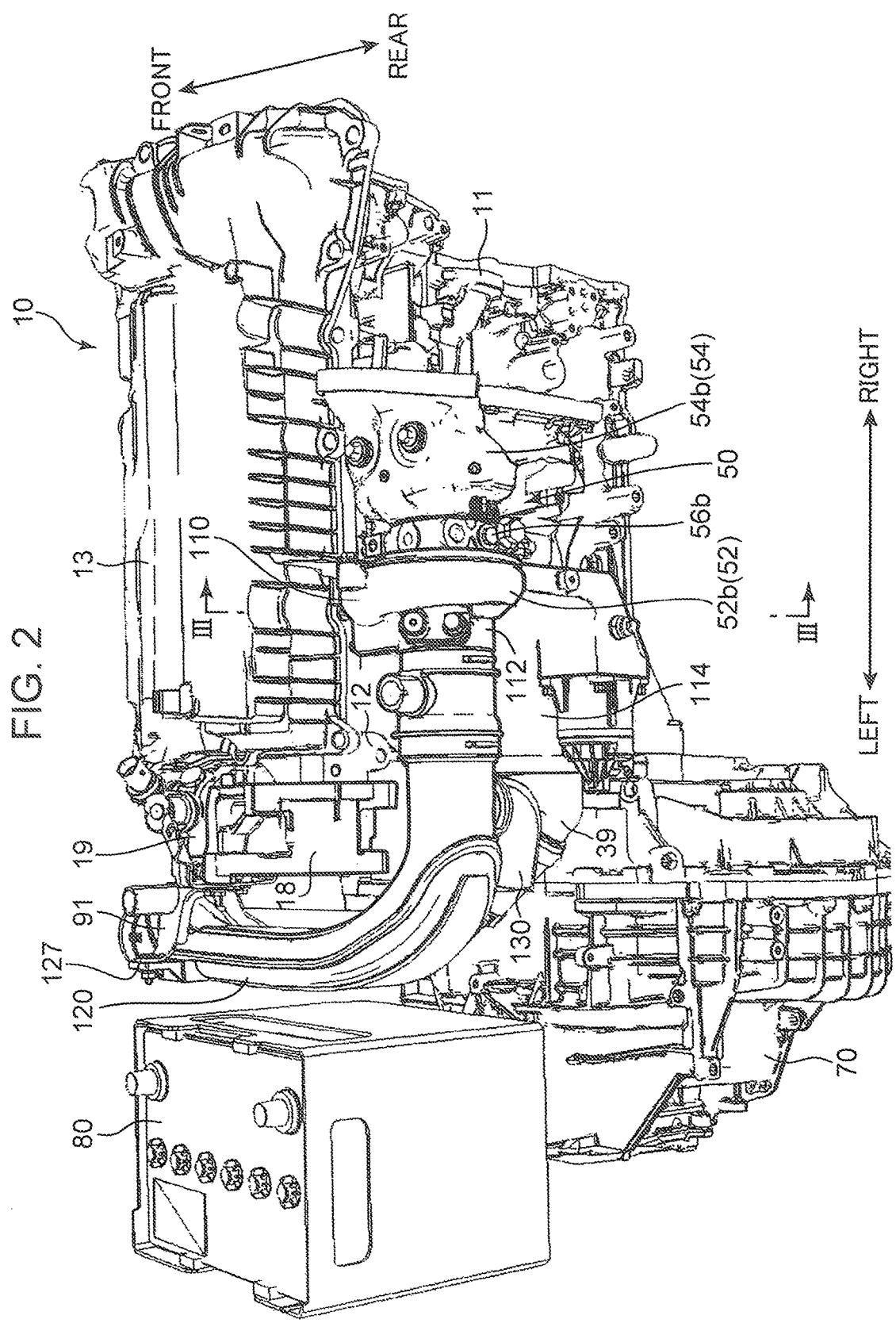
FIG. 2 is a schematic perspective view of an engine body and the surrounding of the engine body.

FIG. 2 is a schematic perspective view of the engine body 10 in a state where the engine body 10 is mounted on the vehicle and the surrounding of such an engine body 10 as viewed from a rear side of the vehicle. In FIG. 2, a portion of the air intake passage 30, a portion of the exhaust passage 40 and the like are omitted.

The engine body 10 is disposed transversely in the inside of an engine room, that is, in a posture where an arrangement direction of the cylinders agrees with a vehicle width direction (a lateral direction in FIG. 2). Further, in this embodiment, the engine body 10 is disposed such that an intake side of the engine body 10 is positioned on a front side in a vehicle longitudinal direction, and an exhaust side of the engine body 10 is positioned on a rear side in the vehicle longitudinal direction. To be more specific, the engine body 10 includes a cylinder block 11 in which the cylinders 10a are formed, and a cylinder head 12 which covers the cylinder block 11 from above. The cylinder head 12 is covered by a head cover 13. Intake ports (not shown in the drawing) which are communicated with the independent passages 34 respectively and through which intake air is introduced into the respective cylinders 10a are formed in the cylinder head 12. The engine body 10 is disposed such that these intake ports are arranged in a row in the vehicle width direction on a front portion of the cylinder head 12 in the vehicle longitudinal direction. On a rear portion of the cylinder head 12 in the vehicle longitudinal direction, exhaust ports (not shown in the drawing) which are communicated with the exhaust passage 40 and through which exhaust air is discharged to the exhaust passage 40 from the respective cylinders are arranged in a row in the vehicle width direction. In the description made hereinafter, "vehicle longitudinal direction" is simply referred to as "longitudinal direction" when appropriate. Further, "vehicle width direction" is referred to as "lateral direction", and "right side" and "left side" in FIG. 2 are simply referred to as "right" and "left" respectively.

A transmission is disposed on a left side of a lower portion of the engine body 10 in a state where the transmission is connected to the engine body 10. To be more specific, a transmission case 70 which houses a transmission body in the inside thereof is disposed on a left side of the cylinder block 11 in a state where the transmission case 70 is connected to a left side surface of the cylinder block 11.

A battery 80 is disposed above the transmission case 70, that is, on a left side of the upper portion of the engine body 10. To be more specific, a rear housing 18 and a fuel pump 19 are mounted on a left side surface of the cylinder head 12, and the battery 80 is disposed at a position leftwardly away from the rear housing 18 and the fuel pump 19. The fuel pump 19 is a pump for pressure feeding fuel to the engine body 10. Further, these components are connected to the cylinder head 12 in a state where the fuel pump 19 is positioned in front of the rear housing 18. In this embodiment, the rear housing 18 is formed integrally with the cylinder head 12.

The turbo supercharger 50 is disposed behind the engine body 10 in a posture that the rotary shaft 56 extends in the vehicle width direction, the compressor 52 is positioned on a left side of the rotary shaft 56, and the turbine 54 is positioned on a right side of the rotary shaft 56. The rotary shaft 56 is housed in the inside of a housing 56b connected between the compressor housing 52b and the turbine housing 54b. In this manner, the turbo supercharger 50 is disposed behind the engine body 10. Accordingly, in this embodiment, a distance between the respective cylinders 10a of the engine body 10 and the turbine 54 can be shortened and hence, an energy of exhaust air which flows into the turbine 54 can be increased whereby a supercharging pressure can be increased.

In this embodiment, the compressor housing 52b, a portion of the air intake passage 30, and the bypass passage 60 are formed as a unit, and such a unit 110 (hereinafter referred to as a housing unit 110) is disposed on a rear left side of the engine body 10.

The detailed structure of the housing unit 110 is described with reference to FIG. 2, and FIG. 3 which is a cross-sectional view taken along a line in FIG. 2.

The housing unit 110 is an integral body formed of: a portion which surrounds an outer periphery of the compressor body 52a and functions as the compressor housing 52b; an air intake passage 112 and a discharge passage 114 which are connected to the compressor housing 52b and form portions of the air intake passage 30; and the bypass passage 60. The compressor housing 52b has an approximately circular profile.

The air intake passage 112 is a portion which extends toward an upstream side from the compressor housing 52b, and extends leftward from an intake port 52b_in which is formed in a center portion of the left side surface of the compressor housing 52b. The discharge passage 114 is a portion which extends toward a downstream side from the compressor housing 52b, and extends obliquely leftward and downward from a discharge port 52b_out which is formed in a lower portion of the compressor housing 52b and, subsequently, extends leftward and substantially straightly. The air intake passage 112 and the discharge passage 114 have an approximately circular cross-sectional shape respectively.

The bypass passage 60 extends in a radial direction of the compressor housing 52b between the air intake passage 112 and the discharge passage 114, and makes the air intake passage 112 and the discharge passage 114 communicate with each other.

Figure 3:
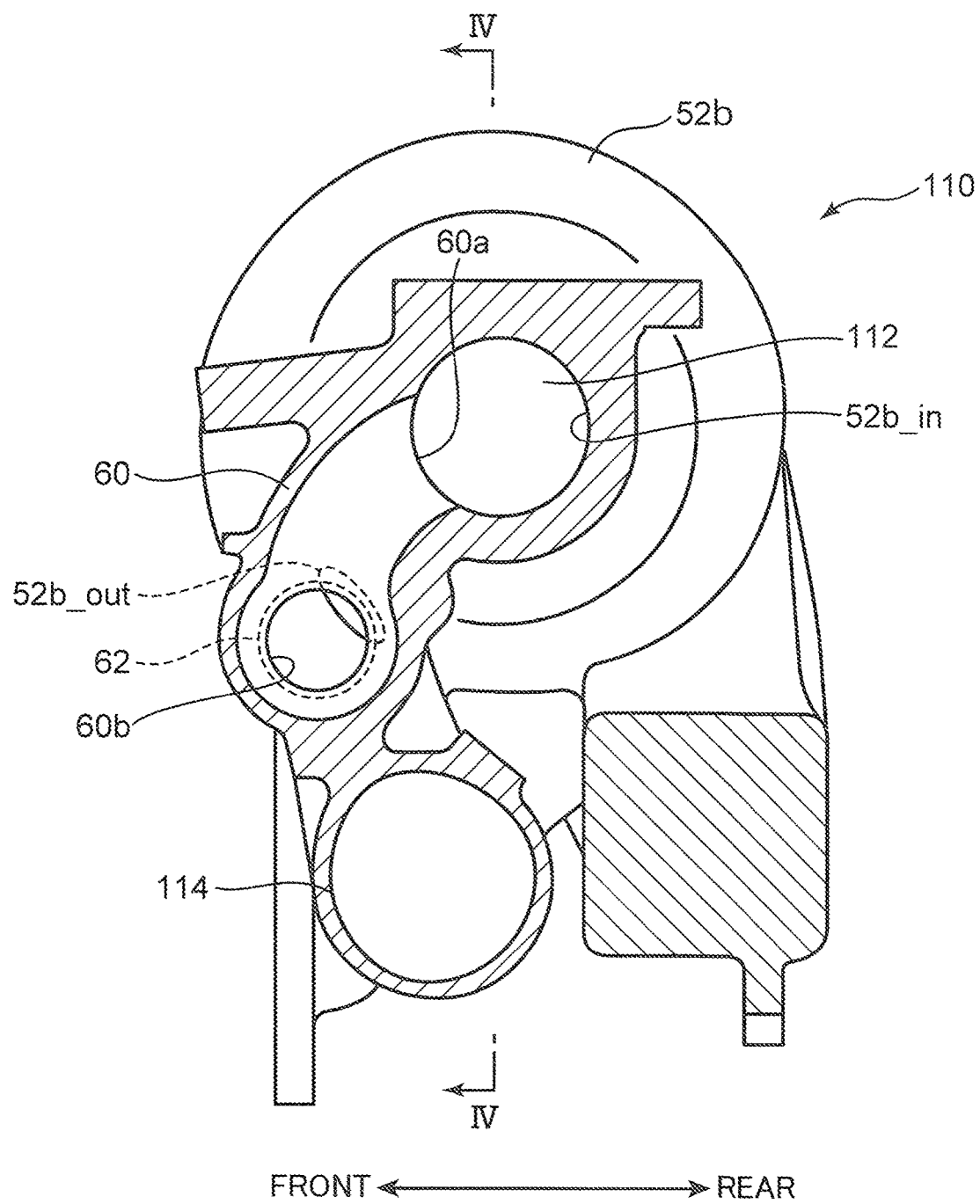
FIG. 3 is a cross-sectional view taken along a line in FIG. 2.
Figure 4:
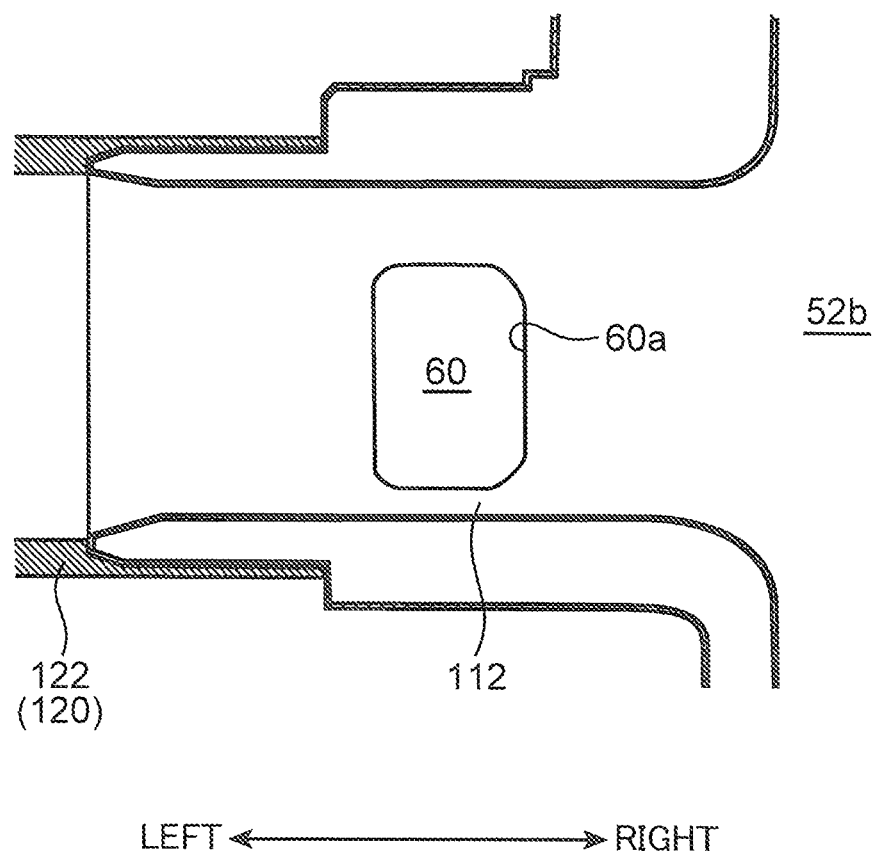
FIG. 4 is a view showing a portion of a cross section taken along a line IV-IV in FIG. 3.

To be more specific, as shown in FIG. 4 which shows a portion of the cross section taken along a line IV-IV in FIG. 3, an opening portion extending in the circumferential direction and having an approximately rectangular shape is formed in an inner peripheral surface of the air intake passage 112, and the opening portion functions as the upstream-side connecting portion 60a. Further, as shown in FIG. 3, an opening portion having an approximately circular shape is formed in an inner peripheral surface of the discharge passage 114, and the opening portion functions as the downstream-side connecting portion 60b. The bypass passage 60 makes these opening portions 60a, 60b communicate with each other.

The ABV 62 which opens or closes the bypass passage 60 is disposed on the opening portion 60b which is formed in the discharge passage 114, that is, disposed on the downstream-side connecting portion 60b, and the ABV 62 opens or closes the downstream-side connecting portion 60b.

An air pipe (upstream-side pipe) 120 which forms a part of a portion of the air intake passage 30 disposed upstream of the compressor 52 is connected to the air intake passage 112. As shown in FIG. 2, the air pipe 120 extends leftward from the air intake passage 112, is bent frontward and, subsequently, extends frontward substantially straightly. In this embodiment, the air pipe 120 extends frontward through between the engine body 10 and the battery 80. To be more specific, the air pipe 120 passes through between the rear housing 18 and the battery 80 and through between the fuel pump 19 and the battery 80, and extends to an area in the vicinity of a front surface of the engine body 10 from the air intake passage 112. Although not shown in the drawing, a passage which forms a portion of the air intake passage 30 further extends from an upstream end of the air pipe 120, and is connected to an air cleaner and the like in front of the engine body 10. The detailed structure of the air pipe 120 is described later.

A downstream-side passage 39 which forms a portion of the air intake passage 30 is connected also to the discharge passage 114. The downstream-side passage 39 extends below the air pipe 120 substantially parallel to the air pipe 120. To be more specific, the downstream-side passage 39 extends leftward from the discharge passage 114, is inclined obliquely leftward and frontward and, subsequently, extends frontward substantially straightly while passing through between the engine body 10 and the battery 80. On the other hand, the downstream-side passage 39 extends frontward while passing an area which is disposed below the rear housing 18 and the fuel pump 19 and ensures a large lateral size. Although not shown in the drawing, a passage which forms a portion of the air intake passage 30 further extends from an upstream end of the downstream-side passage 39, and is connected to the front surface of the engine body 10 by way of the intercooler 31 and the like.

(3) Structure of Intake Passage and Air Pipe
(i) Overall Structure

Figure 5:
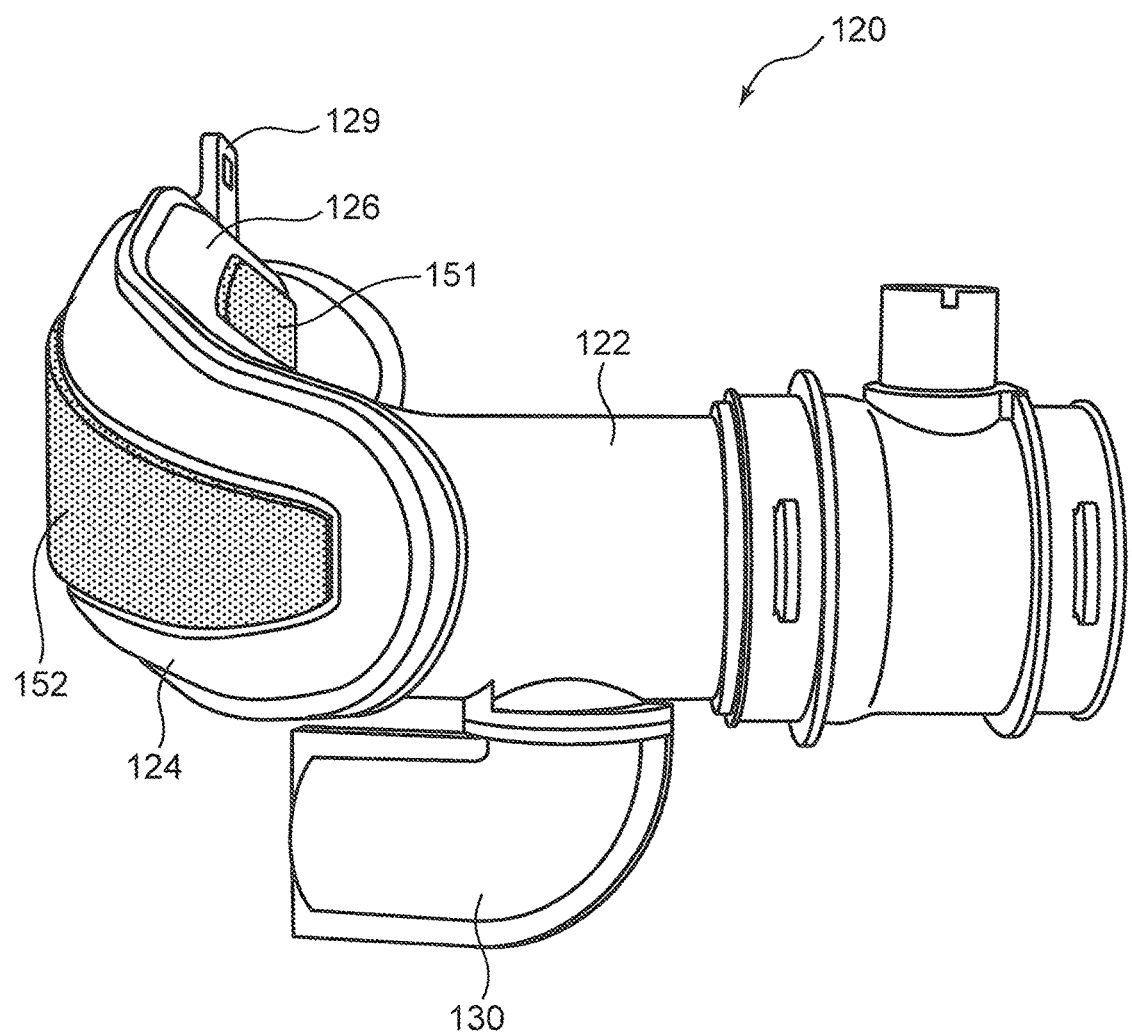
FIG. 5 is a rear view of an air pipe.
Figure 6:
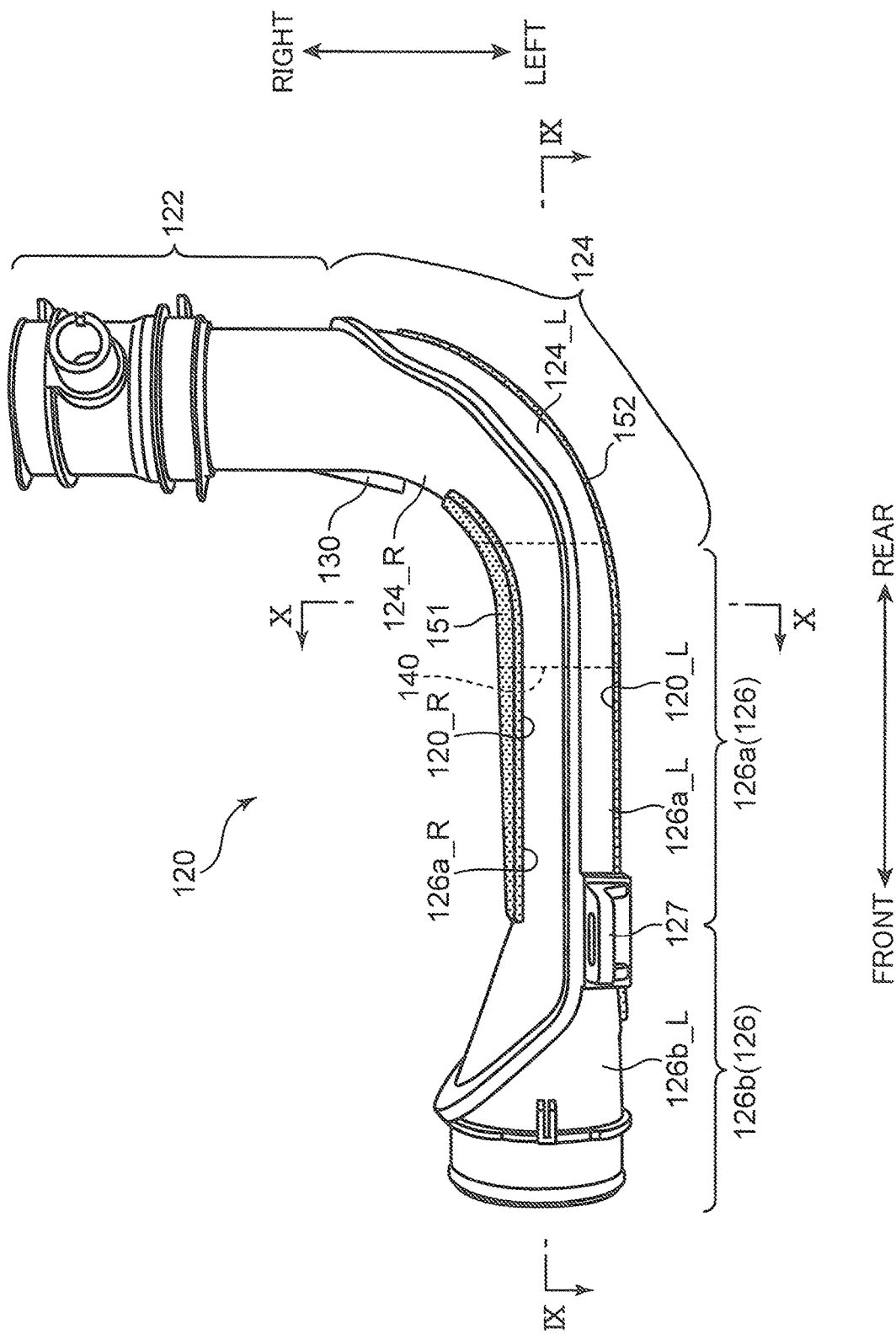
FIG. 6 is a top plan view of the air pipe.
Figure 7:
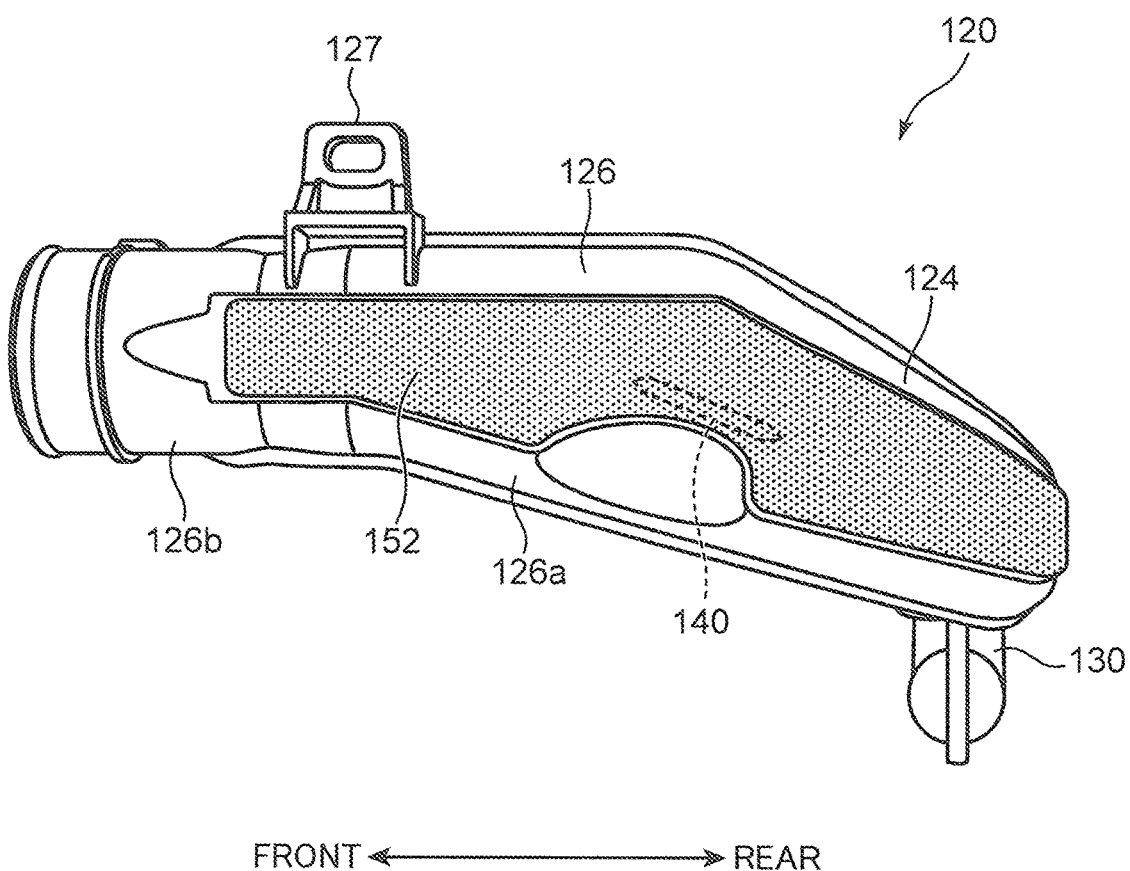
FIG. 7 is a side view of the air pipe as viewed from a left side.
Figure 8:
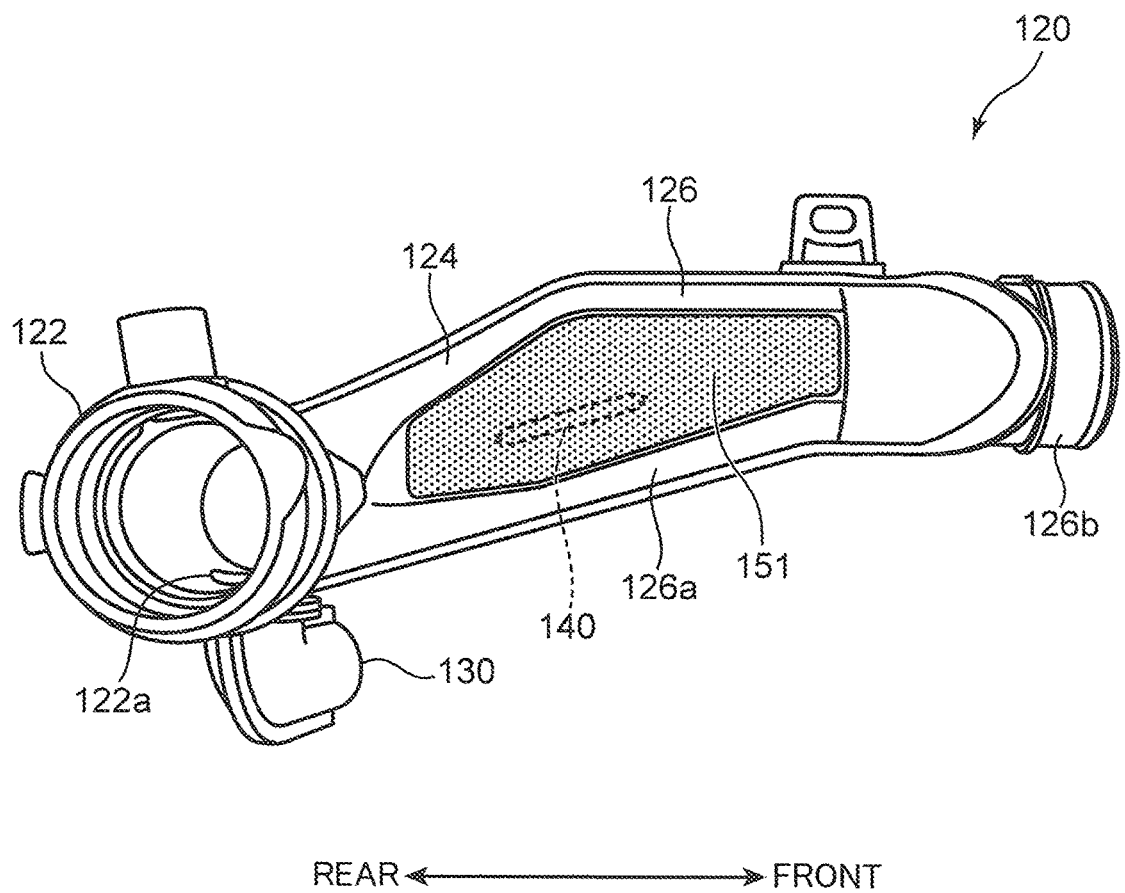
FIG. 8 is a side view of the air pipe as viewed from a right side.
Figure 9:
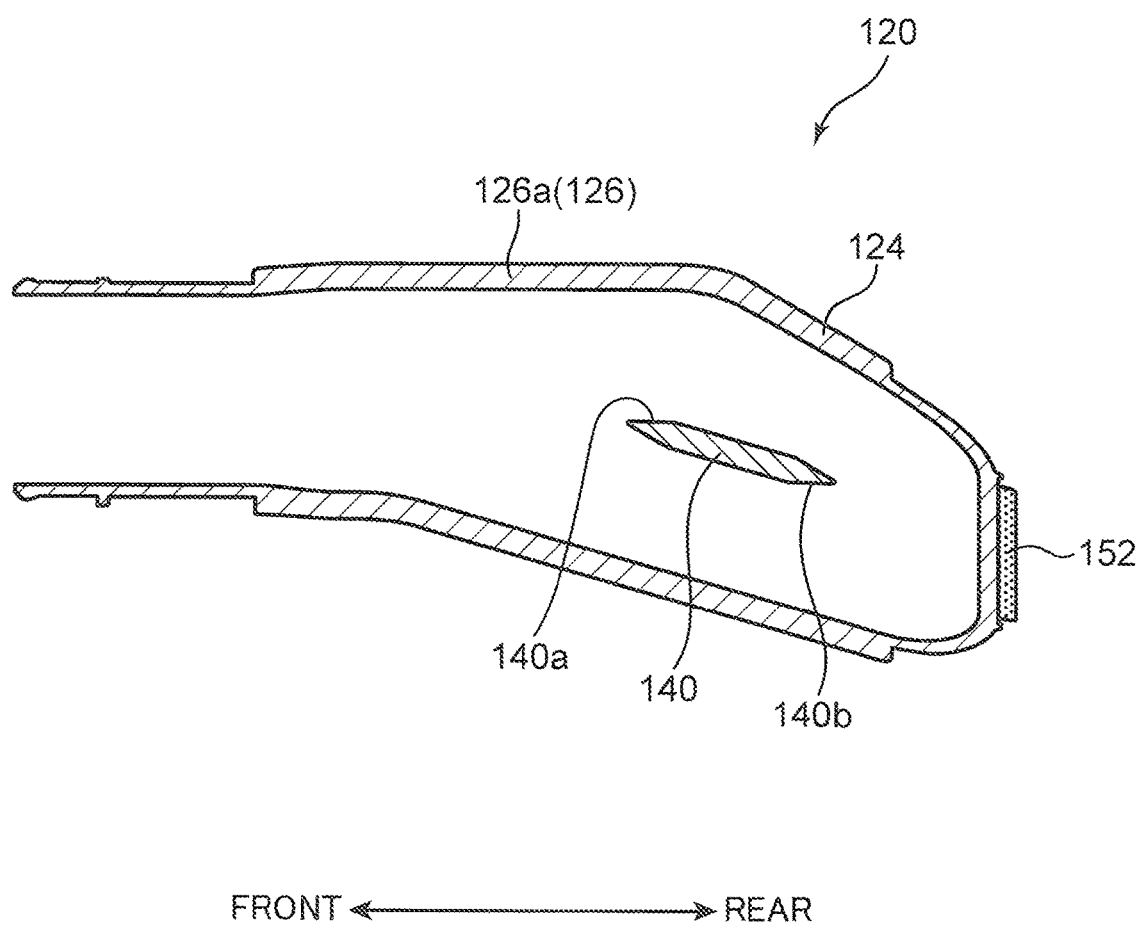
FIG. 9 is a cross-sectional view taken along a line IX-IX in FIG. 6.
Figure 10:
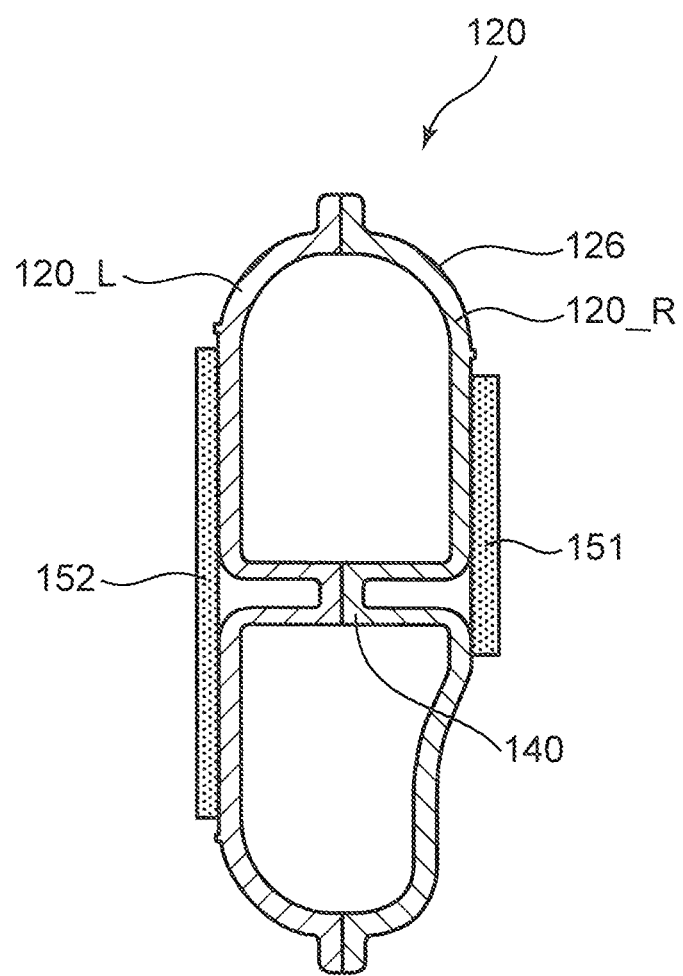
FIG. 10 is a cross-sectional view taken along a line X-X in FIG. 6.

FIG. 5 is a rear view of the air pipe 120, FIG. 6 is a top plan view of the air pipe 120, FIG. 7 is a side view of the air pipe 120 as viewed from a left side, FIG. 8 is a side view of the air pipe 120 as viewed from a right side, FIG. 9 is a cross-sectional view taken along a line IX-IX in FIG. 6, and FIG. 10 is a cross-sectional view taken along a line X-X in FIG. 6.

As described above, the air pipe 120 extends leftward from the air intake passage 112, is bent frontward and, subsequently, extends frontward substantially straightly. The air pipe 120 includes a first straight portion (first passage) 122 which extends leftward substantially straightly along a lateral direction from the air intake passage 112, a bent portion 124 which is bent frontward from an upstream end of the first straight portion 122, and a second straight portion 126 which extends frontward substantially straightly along the longitudinal direction from the upstream end of the bent portion 124.

A cross-sectional shape (a profile or a cross-sectional shape of a passage, hereinafter simply referred to as a cross-sectional shape) of the first straight portion 122 is an approximately circular shape substantially equal to the cross-sectional shape of the air intake passage 112. An inner peripheral surface of the first straight portion 122 continuously extends with the same shape as the inner peripheral surface of the air intake passage 112. In this embodiment, as shown in FIG. 4, the air intake passage 112 is connected to the first straight portion 122 in a state where the air intake passage 112 is fitted and inserted into the inside of a downstream end portion of the first straight portion 122.

On the other hand, a cross-sectional shape of the bent portion 124 in a direction orthogonal to an upstream and downstream direction is formed such that a size in the width direction, that is, in a direction orthogonal to the vertical direction and the upstream and downstream direction is gradually decreased toward an upstream side, and a size in the vertical direction is gradually increased toward the upstream side. In this embodiment, as shown in FIG. 7, the bent portion 124 is inclined upward toward a front side.

A cross-sectional shape of a downstream-side portion 126a of the second straight portion 126 is formed such that a size in the vertical direction is larger than a size in the width direction, that is, a size in the lateral direction orthogonal to the vertical direction and in the upstream and downstream direction. The cross section of the downstream-side portion 126a of the second straight portion 126 has an approximately vertically-elongated shape, that is, an approximately elliptical shape elongated in the vertical direction as shown in FIG. 10. In this manner, the downstream-side portion 126a of the second straight portion 126 has a flattened shape where a size in the lateral direction is smaller than a size in the vertical direction. Hereinafter, there may be a case where such a portion 126a is referred to as a flattened portion 126a. In this embodiment, as shown in FIG. 7, the flattened portion 126a has a shape where an upper edge of the flattened portion 126a extends in the longitudinal direction along an approximately horizontal plane, and a lower edge of the flattened portion 126a is inclined upward toward a front side. The flattened portion 126a corresponds to a second passage in Claims.

On the other hand, an upstream end of the second straight portion 126 has a circular cylindrical shape, and an upstream-side portion 126b of the second straight portion 126 (hereinafter, the upstream-side portion 126b may be referred to as an enlarged diameter portion 126b) is configured such that a lateral size is gradually increased toward an upstream end of the circular cylindrical shape. To be more specific, as shown in FIG. 6, the enlarged diameter portion 126b is configured such that a right side wall of the enlarged diameter portion 126b is gradually inclined rightward so that the lateral size of the enlarged diameter portion 126b is increased. On the other hand, as shown in FIG. 7, the enlarged diameter portion 126b extends frontward with a vertical size substantially equal to a vertical size of the upstream end of the flattened portion 126a.

The air pipe 120 having the configuration described above is supported by the housing unit 110 due to fitting of the downstream end portion of the first straight portion 122 into the air intake passage 112 as described above. At the same time, a support portion 127 formed on an upstream end portion of the air pipe 120 is supported by the engine body 10 by way of a bracket 91 and hence, the air pipe 120 is fixed in a posture where the air pipe 120 extends frontward while passing through a gap formed between the engine body 10 and the battery 80 from the housing unit 110.

(ii) Resonator

A resonator 130 is connected to the first straight portion 122 of the air pipe 120, and a space formed in the resonator 130 communicates with an inner space formed in the first straight portion 122. To be more specific, as shown in FIG. 8, the resonator 130 communicates with the first straight portion 122 through a circular opening portion 122a formed in a lower surface of the first straight portion 122. The resonator 130 is a cylindrical member having an end portion thereof on a side opposite to the opening portion 122a closed. In this embodiment, the resonator 130 extends downward from a lower surface of the first straight portion 122, and is bent and extends leftward. On the other hand, as shown in FIG. 5, a size of the resonator 130 in the lateral direction is sufficiently smaller than a size of the air pipe 120 in the lateral direction, and the resonator 130 is positioned on a right side of a left end portion of the air pipe 120.

(iii) Support Strut

A support strut (vibration suppressing support strut) 140 which connects both side walls 120_R, 120_L of the air pipe 120 in the width direction (a direction orthogonal to the vertical direction and the upstream and downstream direction, in this embodiment, the lateral direction) to each other in the inner space of the air pipe 120 is formed on a portion of the air pipe 120 disposed upstream of the first straight portion 122 (a portion formed of the bent portion 124 and the second straight portion 126). In this embodiment, the support strut 140 is formed in an extending manner between and over the bent portion 124 and the flattened portion 126a. To be more specific, the support strut 140 extends toward an upstream side from a portion of the bent portion 124 slightly downstream of an upstream end of the bent portion 124.

As shown in FIG. 10, the support strut 140 is disposed approximately in the vicinity of the center of the air pipe 120 in the vertical direction. At a portion of the air pipe 120 where the support strut 140 is formed, the inner space of the air pipe 120 is vertically divided in two by the support strut 140. A size of the support strut 140 in the vertical direction is suppressed to a size sufficiently smaller than a size of the air pipe 120 in the vertical direction.

In this embodiment, as shown in FIG. 10, the support strut 140 is formed on the air pipe 120 by forming both left and right side walls 120_R, 120_L of the air pipe 120 such that the left and right side walls 120_R, 120_L of the air pipe 120 are recessed toward the center in the lateral direction.

As shown in FIG. 9, an upstream end portion 140a of the support strut 140 is formed in a tapered shape where a thickness, that is, a size of the upstream end portion 140a in the vertical direction is gradually decreased toward an upstream side. To be more specific, in the upstream end portion 140a of the support strut 140, an upper surface is inclined downward and a lower surface is inclined upward as the upstream end portion 140a extends toward an upstream side. Accordingly, the upstream end portion 140*a* of the support strut 140 is formed into a pointed shape. In the same manner, a downstream end portion 140*b* of the support strut 140 is also formed into a pointed shape, and has a tapered shape where a thickness, that is, a size in the vertical direction is gradually decreased toward a downstream side. In this embodiment, in the same manner as the upstream end portion 140*a*, the downstream end portion 140*b* is formed into a pointed shape such that an upper surface is inclined downward as the downstream end portion 140*b* extends toward a downstream side and a lower surface is inclined upward as the downstream end portion 140*b* extends toward a downstream side.

(iv) Vibration Damping Material

At the bent portion 124 of a portion of the air pipe 120 disposed upstream of the first straight portion 122, vibration damping materials 151, 152 are fixed to surfaces of both outer side walls of the bent portion 124 on an inner peripheral side (a side where a curvature is large) and on an outer peripheral side (a side where a curvature is small) respectively. The vibration damping materials 151, 152 are provided for absorbing vibrations of the air pipe 120, and are respectively made of a material which uses butyl rubber or the like having a high damping effect as a base material, for example.

In this embodiment, as shown in FIG. 6, the vibration damping materials 151, 152 are respectively adhered to: the approximately whole surface of the side wall 124_R on the inner peripheral side of the bent portion 124, the approximately whole surface of the side wall 124_L on the outer peripheral side of the bent portion 124, an approximately whole surface of a side wall 126*a*_R which is a side wall of the flattened portion 126*a* on the inner peripheral side of the bent portion 124 and is positioned on a right side in the lateral direction, and an approximately whole surface of a side wall 126*a*_L which is a side wall of the flattened portion 126*a* on the outer peripheral side of the bent portion 124 and is positioned on a left side in the lateral direction.

To be more specific, as shown in FIG. 6 and the like, with respect to the inner peripheral side of the bent portion 124, the vibration damping material 152 is continuously adhered to the air pipe 120 from a portion disposed in the vicinity of a downstream end of the bent portion 124 to a portion disposed upstream of an upstream end of the flattened portion 126*a*, that is, a portion disposed downstream of a side wall 126*b*_L on a left side of the enlarged diameter portion 126*b*. With respect to the outer peripheral side of the bent portion 124, the vibration damping material 151 is adhered to the air pipe 120 from a portion disposed in the vicinity of the center portion of the bent portion 124 in the upstream and downstream direction to the upstream end of the flattened portion 126*a*. Further, as shown in FIGS. 7 and 8, with respect to the vertical direction, the vibration damping materials 151, 152 are adhered to the whole bent portion 124 and the whole flattened portion 126*a* except for upper edge portions and lower edge portions of both outer surfaces.

(4) Manner of Operation and the Like of Air Intake Device According to First Embodiment As described above, in this embodiment, the portion of the air intake passage 30 which is formed of the air intake passage 112 and the air pipe 120 and extends toward an upstream side from the compressor 52 extends leftward from the compressor 52 and, subsequently, is bent frontward and extends frontward. Further, the flattened portion 126*a* which forms the frontwardly extending portion is formed into a shape where a size in the width direction (a size in the lateral direction) of the flattened portion 126*a* is suppressed small. Accordingly, the air intake passage 30 can be disposed around the engine body 10 in a compact manner. To be more specific, as described above, the air intake passage 30 can be disposed such that the air intake passage 30 extends from the compressor 52 disposed behind the engine body 10, passes a narrow space formed between the battery 80 and the engine body 10 (the rear housing 18 and the fuel pump 19), and extends frontward. Accordingly, it is unnecessary to ensure a wide space for the air intake passage 30 by increasing a distance between the battery 80 and the engine body 10 or the like for disposing the air intake passage 30 in the space and hence, the surroundings of the engine body 10 can be made compact.

However, the mere formation of the air intake passage 30 having the configuration described above gives rise to a drawback that noises are increased.

To be more specific, the bypass passage 60 is connected to the portion of the air intake passage 30 just upstream of the compressor 52, and the air intake passage 30 is bent at the bent portion 124 positioned upstream of the upstream-side connecting portion 60*a* which forms the connecting portion. Accordingly, along with the inflow of high-pressure intake air to an upstream side through the bypass passage 62 which takes place at the time of opening the ABV 62, a pressure wave which propagates to an upstream side from the upstream-side connecting portion 60*a* impinges on the bent portion 124, and due to such impingement of the pressure wave, the bent portion 124 and the flattened portion 126*a* are vibrated so that noises are generated. Particularly, the flattened portion 126*a* is formed to have a vertically elongated cross-sectional shape as described above and hence, both side walls (both left and right side walls) of the flattened portion 126*a* in the width direction respectively have a planar surface shape having a relatively wide area whereby vibrations of the flattened portion 126*a* are increased so that noises are easily increased. Further, when the ABV 62 is closed, while the bypass passage 62 is closed, intake air flows through the air intake passage 30 and hence, a vortex is generated and extinguished repeatedly at the upstream-side connecting portion 60*a* whereby, along with such generation and extinction of the vortex, a pressure wave is generated. This pressure wave propagates to an upstream side and impinges on the bent portion 124 and hence, the flattened portion 126*a* is vibrated so that noises are increased. In this embodiment, a frequency of noises generated when the ABV 62 is opened and a frequency of noises generated when the ABV 62 is closed differ from each other. That is, the frequency of noises generated when the ABV 62 is opened is higher than the frequency of noises generated when the ABV 62 is closed.

In view of such circumstances, in this embodiment, the resonator 130 is connected to a portion of the first straight portion 122 which is disposed between the upstream-side connecting portion 60*a* and the bent portion 124 of the air intake passage 30. Accordingly, it is possible to reduce a magnitude of a pressure wave directed toward the bent portion 124 and the flattened portion 126*a*, that is, a magnitude of noises. That is, resonance can be generated in the resonator 130 so that noises can be made small. In this embodiment, the air intake device is configured such that noises generated when the ABV 62 is closed can be reduced by the resonator 130, and a size of the resonator 130 is set to a size corresponding to a frequency of noises.

Further, in this embodiment, the vibration damping materials 151, 152 are adhered to the respective surfaces of the side wall 124_R on the inner peripheral side of the bent portion 124 and the side wall 124_L on the outer peripheral side of the bent portion 124 and the right side wall 126a_R and the left side wall 126a_L of the flattened portion 126a respectively. Accordingly, vibrations of the bent portion 124 and the flattened portion 126a can be suppressed by the vibration damping materials 151, 152 and hence, noises generated along with such vibrations can be made small. In this embodiment, the vibration damping materials 151, 152 are configured to reduce noises generated at the time of opening the ABV 62, and the vibration damping materials 151, 152 can cope with a relatively high frequency.

Figure 11:
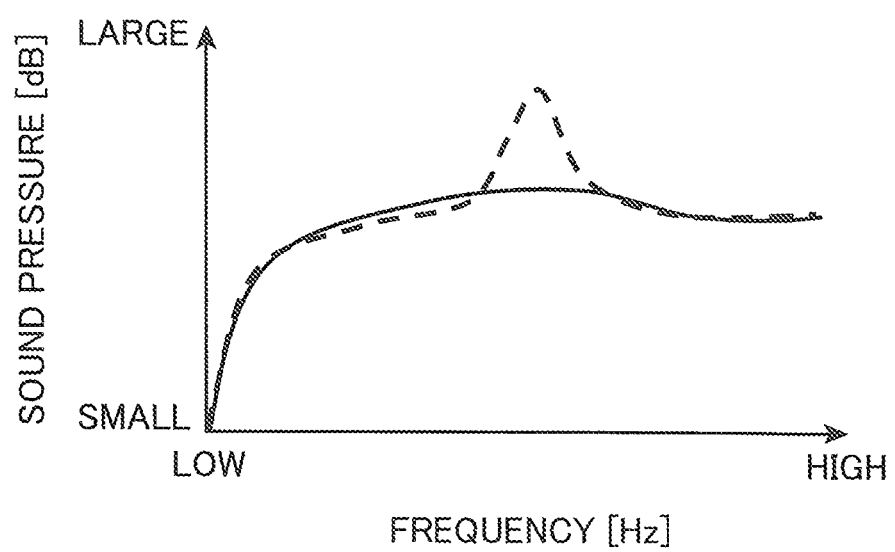
FIG. 11 is a graph showing an effect obtained by a support strut.

Further, in this embodiment, the support strut 140 which connects both left and right side walls 120_R, 120_L of the air pipe 120 to each other is mounted on a portion of the air pipe 120 which corresponds to the bent portion 124 and the flattened portion 126a. Accordingly, it is possible to suppress displacement of both side walls 120_R, 120_L, that is, vibrations of the side wall 124_R on the inner peripheral side of the bent portion 124 and the side wall 124_L on the outer peripheral side of the bent portion 124, and vibrations of both left and right side walls 126a_R, 126a_L of the flattened portion 126a and hence, noises generated along with such vibrations can be made small This advantageous effect is shown in FIG. 11. FIG. 11 is a graph obtained by measuring a sound pressure of noises generated in the air pipe 120 at the time of closing the ABV 62. A frequency is taken on an axis of ordinates and a sound pressure is taken on an axis of abscissas. A broken line in FIG. 11 indicates a result when the support strut 140 is not mounted on the air pipe 120, and a solid line in FIG. 11 indicates a result when the support strut 140 is mounted on the air pipe 120. As shown in FIG. 11, when the support strut 140 is not mounted on the air pipe 120, a sound pressure is increased at a predetermined frequency at the time of closing the ABV 62. To the contrary, when the support strut 140 is mounted on the air pipe 120, a sound pressure at such a frequency can be decreased. That is, with the provision of the support strut 140, it is possible to suppress a phenomenon that both side walls 124_R, 124_L of the bent portion 124 and the side walls 126a_R, 126a_L of the flattened portion 126a resonate at the frequency and hence, noises can be made small.

As has been described above, in this embodiment, due to the provision of the bypass passage 60 and the ABV 62, the air intake passage 30 and the surroundings of the engine can be made compact while suppressing a damage to the compressor 52 or the like and preventing the increase of noises.

Figure 12:
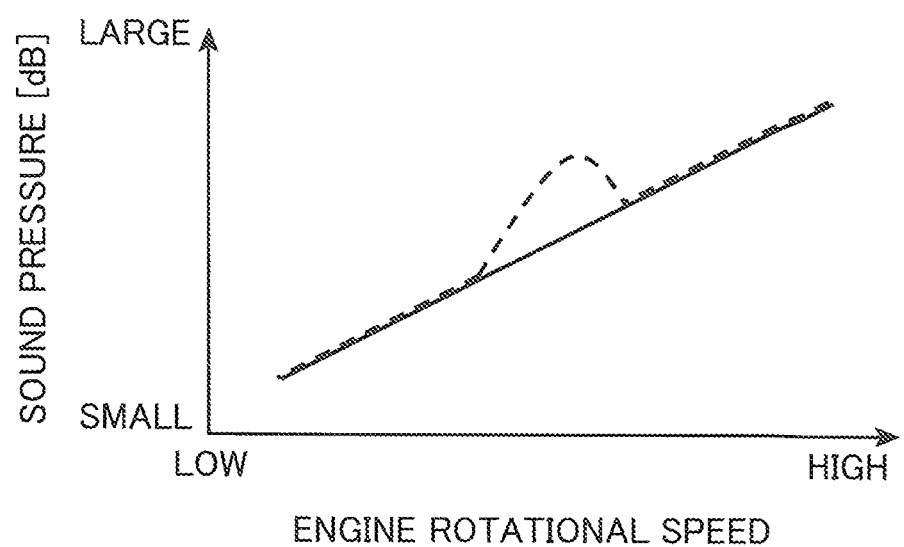
FIG. 12 is a graph showing the difference in sound pressure brought about by a change in shape of an upstream end portion of the support strut.

Moreover, in this embodiment, the upstream end portion 140a and the downstream end portion 140b of the support strut 140 have a tapered shape where a size of the end portion 140a, 140b in the vertical direction is gradually decreased toward an upstream side. With such a configuration, it is possible to make intake air smoothly flow toward a downstream side along the support strut 140. Accordingly, it is possible to suppress the generation of a vortex of intake air around the support strut 140 and hence, it is possible to suppress the increase of an intake air sound brought about by the generation of the vortex. Such an advantageous effect is described more specifically with reference to FIG. 12. FIG. 12 shows a result of measurement of an engine rotational speed and a sound pressure of an intake air sound generated in the air pipe 120. A broken line indicates the result of a case where the support strut 140 is mounted on the air pipe 120 and a size of the support strut 140 in the vertical direction is fixed in the upstream and downstream direction, and a solid line indicates the result of a case where the support strut 140 has a tapered shape where a size of the support strut 140 in the vertical direction is gradually decreased toward an upstream side as in the case of the embodiment described above. As indicated by the broken line in FIG. 12, in the case where the size of the support strut 140 in the vertical direction is fixed in the upstream and downstream direction, an intake air sound, that is, noises are increased in an intermediate rotational speed region. Then, a sound pressure does not become proportional to an engine rotational speed thus giving rise to a possibility that a driver or the like feel uncomfortable. To the contrary, as indicated by the solid line in FIG. 12, in the case where the support strut 140 has a tapered shape where the size of the support strut 140 in the vertical direction is gradually decreased toward an upstream side, the increase of an intake air sound in the intermediate rotational speed region can be suppressed. Further, since the upstream end portion 140a and the downstream end portion 140b of the support strut 140 are formed into a tapered shape, an intake air resistance can be suppressed small.

(5) Second Embodiment

Figure 13:
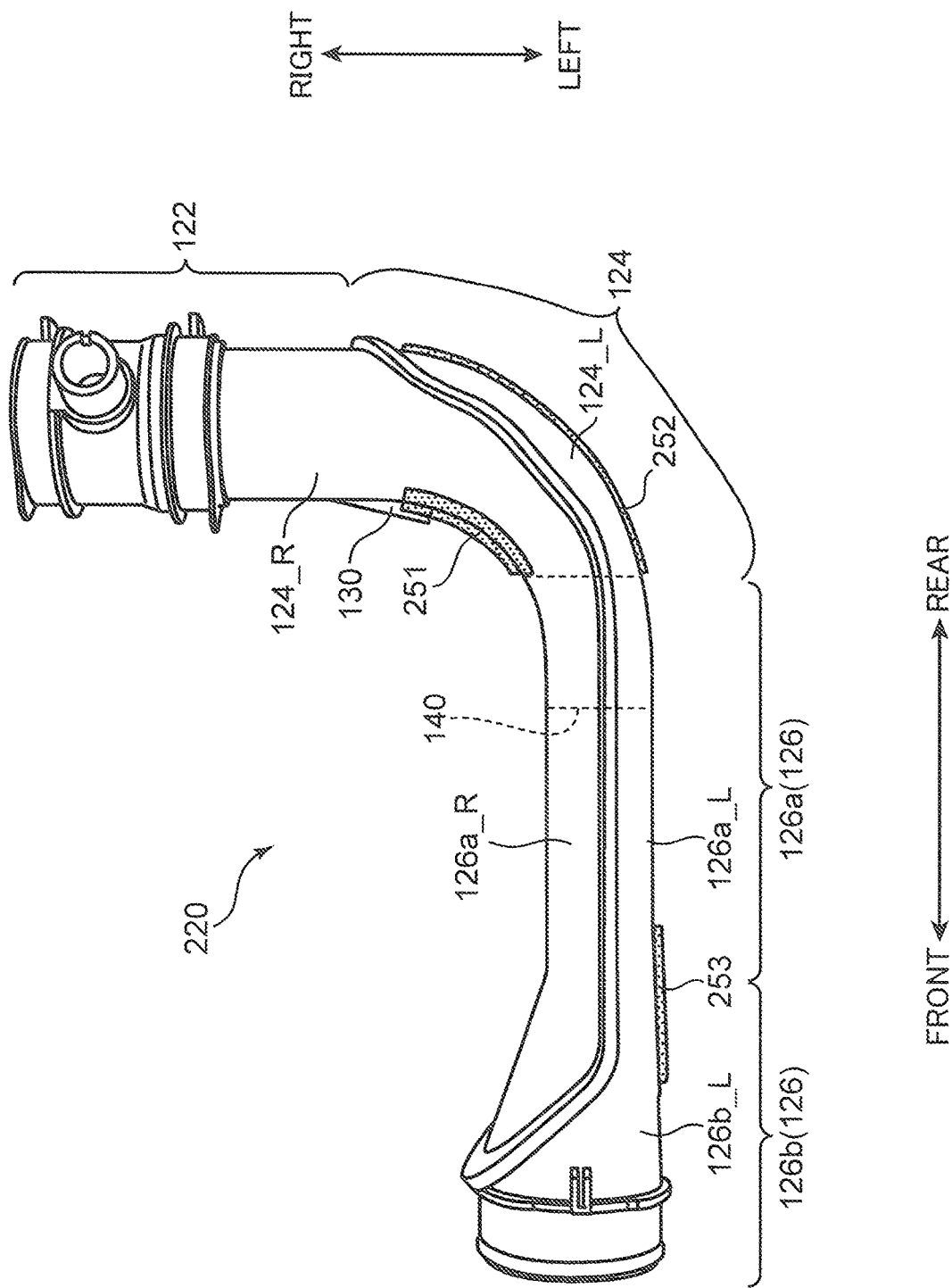
FIG. 13 is a top plan view of an air pipe according to a second embodiment.

In the first embodiment, the description is made with respect to the case where the vibration damping materials 151, 152 are respectively adhered to: approximately the whole surface of the side wall 124_R on the inner peripheral side of the bent portion 124, approximately the whole surface of the side wall 124_L on the outer peripheral side of the bent portion 124, approximately the whole surface of the right side wall 126a_R of the flattened portion 126a, and approximately the whole surface of the left side wall 126a_L of the flattened portion 126a in the upstream and downstream direction. However, as shown in FIG. 13, the vibration damping material may be adhered to some of these surfaces. An air pipe 220 according to the second embodiment is described with reference to FIGS. 13 to 16. In these drawings, constitutional elements identical with the corresponding constitutional elements of the first embodiment are given the same symbols.

Figure 14:
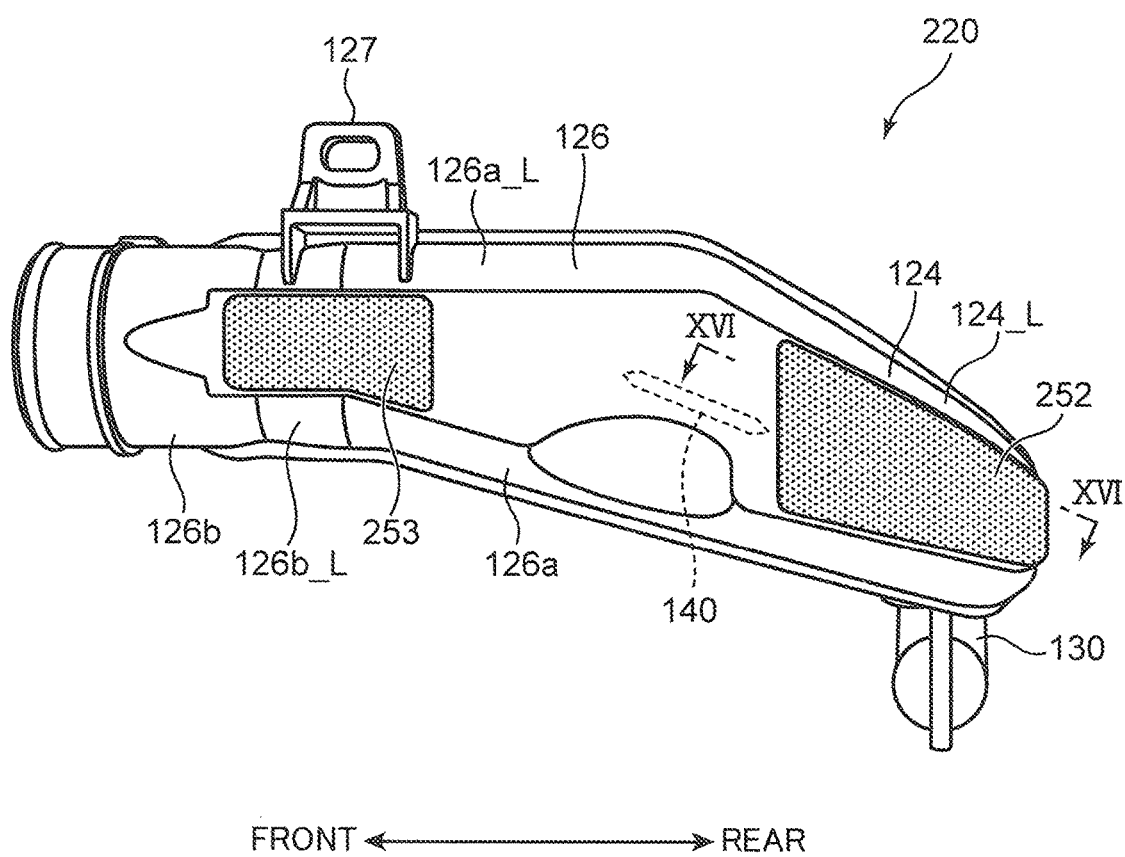
FIG. 14 is a side view of the air pipe according to the second embodiment as viewed from a left side.
Figure 15:
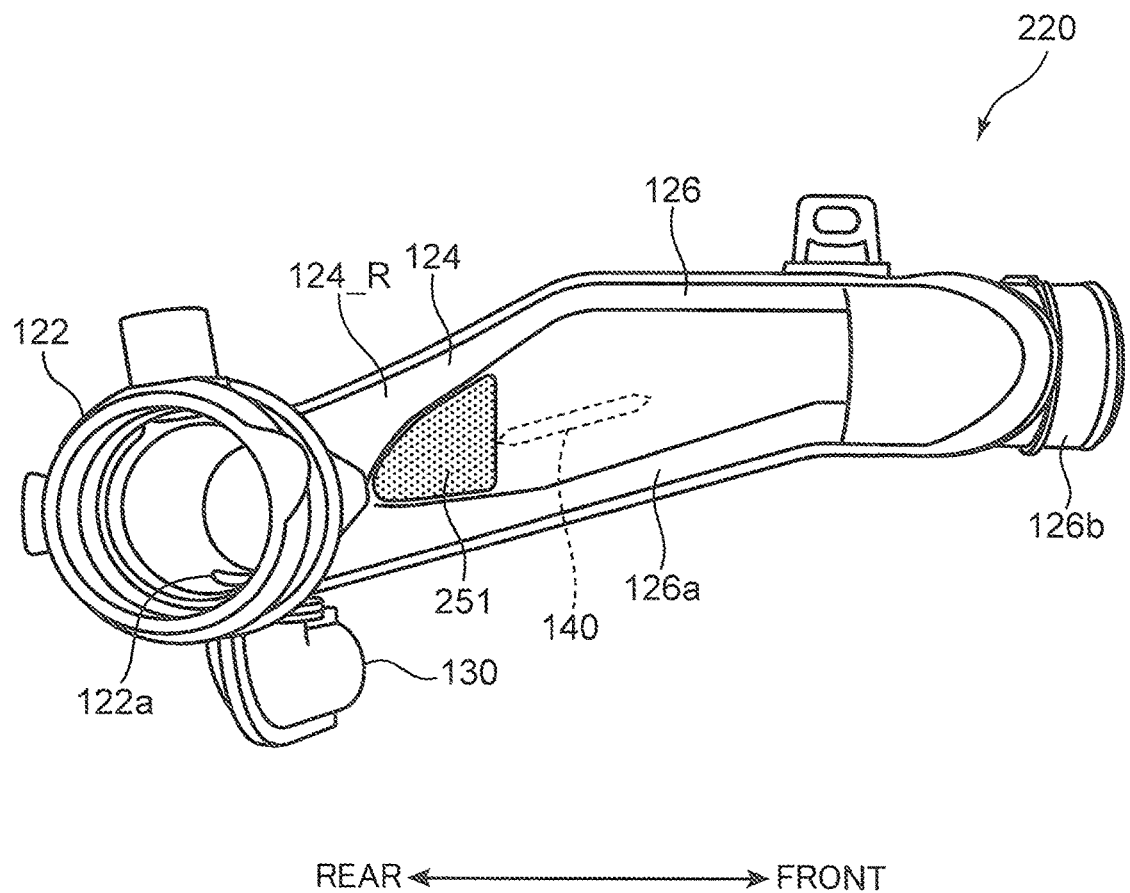
FIG. 15 is a side view of the air pipe according to the second embodiment as viewed from a right side.
Figure 16:
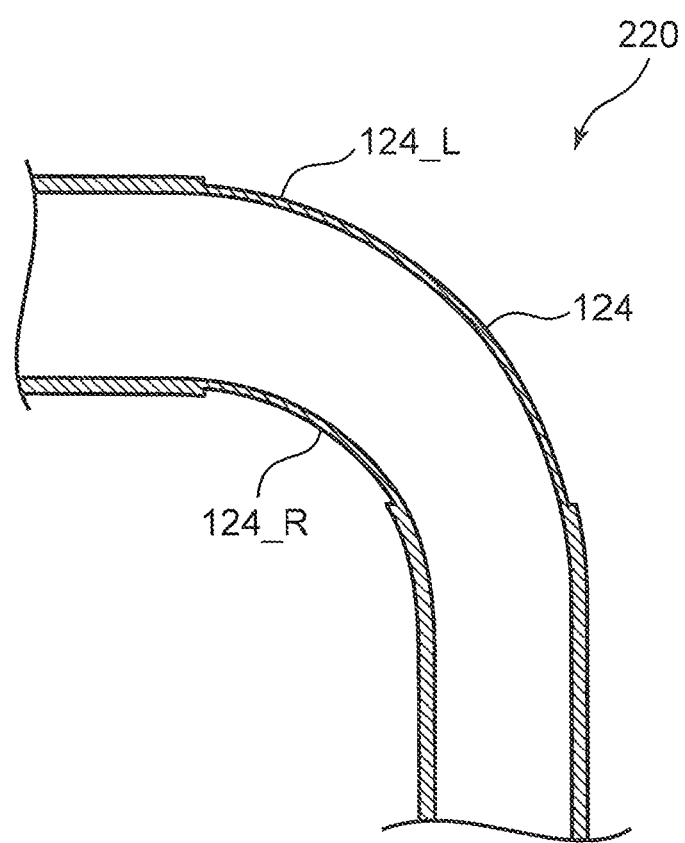
FIG. 16 is a cross-sectional view taken along a line XVI-XVI in FIG. 14.

FIG. 13 is a top plan view of the air pipe 220 according to the second embodiment. In FIG. 13, the illustration of a support portion 127 is omitted. Further, FIG. 14 is a side view of the air pipe 220 according to the second embodiment as viewed from a left side, and FIG. 15 is a side view of the air pipe 220 according to the second embodiment as viewed from a left side. FIG. 16 is a cross-sectional view taken along a line XVI-XVI in FIG. 14.

As shown in FIGS. 13 to 15, in the second embodiment, in the same manner as the first embodiment, vibration damping materials 251, 252 are adhered to approximately the whole surface (excluding an upper edge portion and a lower edge portion) of a side wall 124_R on an inner peripheral side of a bent portion 124 and approximately the whole surface (excluding an upper edge portion and a lower edge portion) of a side wall 124_L on an outer peripheral side of the bent portion 124 respectively. To be more specific, the vibration damping materials 251, 252 are adhered to the respective surfaces from a portion of the bent portion 124 slightly downstream of a downstream end of a support strut 140 to a portion in the vicinity of a downstream end of the bent portion 124 respectively.

On the other hand, different from the first embodiment, a vibration damping material 253 is adhered only to an upstream end portion of a left side wall 126a_L of a flattened portion 126a, and a vibration damping material is not adhered to other portions of the flattened portion 126a. To be more specific, the vibration damping material 253 is adhered only to a portion of the left side wall 126a_L of the flattened portion 126a upstream of a position sufficiently away from the support strut 140 toward an upstream side. The vibration damping material 253 extends toward an upstream side beyond an upstream end of the flattened portion 126a, and a portion of the vibration damping material 253 reaches a downstream-side portion of a left side wall 126b_L of an enlarged diameter portion 126b.

Further, in the second embodiment, as described above, thicknesses of portions to which the vibration damping materials 251, 252, 253 are adhered respectively are set smaller than wall thicknesses of other portions of the air pipe 220. That is, wall thicknesses of portions of the side walls 124_R on the inner peripheral side of the bent portion 124 except for the upper edge portion and the lower edge portion of the side wall 124_R and wall thicknesses of portions of the side wall 124_L on the outer peripheral side of the bent portion 124 except for the upper edge portion and the lower edge portion of the side wall 124_L, a wall thickness of a left side wall of the upstream end portion of the flattened portion 126a except for an upper edge portion and a lower edge portion, and a wall thickness of a left side wall of the downstream end portion of the enlarged diameter portion 126b except for an upper edge portion and a lower edge portion are set smaller than thicknesses of other portions of the air pipe 220. Hereinafter, there may be a case where the portions to which the vibration damping materials 251, 252, 253 are adhered respectively are collectively referred to as vibration damping material adhering portions (specified portions).

In the second embodiment, as shown in FIG. 16, the surfaces of the respective side walls (both left and right side walls) on the inner peripheral side and on the outer peripheral side of the vibration damping material adhering portions are recessed and hence, a wall thickness of the vibration damping material adhering portions is set smaller than a wall thickness of other portions. That is, the air pipe 220 is configured such that the wall thickness of the side wall differs between the vibration damping material adhering portions and other portions in a state where the inner peripheral surface of the air pipe 220 is continuously formed in the upstream and downstream direction. In this embodiment, the wall thickness of the vibration damping material adhering portion is set to approximately a half of the wall thickness of other portions (for example, the wall thickness of the vibration damping material adhering portions is set to approximately 1.5 mm, and a wall thickness of other portions is set to approximately 3 mm).

(6) Manner of Operation and the Like of Air Intake Device According to Second Embodiment As has been described heretofore, in the second embodiment, the region where the vibration damping materials 251, 252, 253 are respectively adhered to the air pipe 220 is set smaller than corresponding region of the first embodiment. Accordingly, an amount of vibration damping material can be suppressed small so that the second embodiment is advantageous in terms of cost.

However, when the region where the vibration damping material is adhered is made small as described above, there exists a possibility that a vibration suppressing effect is decreased. In view of the above, in this second embodiment, as described above, the side wall 124_R on the inner peripheral side of the bent portion 124 and the side wall 124_L on the outer peripheral side of the bent portion 124 and the upstream end portion of the left side wall 126a_R of the flattened portion 126a are set as the vibration damping material adhering portions and, at the same time, the wall thickness of the vibration damping material adhering portions is set smaller than the wall thickness of other portions and hence, a high vibration suppressing effect can be acquired while suppressing the cost.

To be more specific, as described above, a pressure wave which propagates to an upstream side from an upstream-side connecting portion 60a of a bypass passage 62 mainly impinges on the bent portion 124. On the other hand, in this embodiment, the wall thickness of the respective side walls 124_R, 124_L of the bent portion 124 is set small. Accordingly, the impingement of the pressure wave accelerates vibrations of the respective side walls 124_R, 124_L of the bent portion 124 and hence, the bent portion 124 can absorb a larger amount of energy of the pressure wave. The mere increase of vibrations of the bent portion 124 gives rise to a possibility that vibrations transmitted to the flattened portion 126a are also increased so that noises are increased. However, in the second embodiment, the vibration damping materials 251, 252 are adhered to the respective side walls 124_R, 124_L of the bent portion 124 while accelerating vibrations of the bent portion 124 as described above. Accordingly, the bent portion 124 can decrease an energy of the pressure wave which enters the flattened portion 126a by absorbing an energy of the pressure wave and can suppress vibrations transmitted to the flattened portion 126a from the bent portion 124 and hence, vibrations of the flattened portion 126a and noises which are brought about by the vibrations of the flattened portion 126a can be effectively made small.

In the second embodiment, as described above, the vibration damping material 253 is adhered also to the upstream end portion of the left side wall 126a_L of the flattened portion 126a and hence, vibrations of both end portions of the left side wall 126a_L of the flattened portion 126a in the upstream and downstream direction are suppressed by the vibration damping material 253 and the vibration damping material 252 applied to the bent portion 124. Accordingly, also with such a configuration, vibrations of the flattened portion 126a can be effectively suppressed.

In the second embodiment, the vibration damping materials 251, 252, 253 are applied to portions of the air pipe 220 except for a portion where the support strut 140 is disposed, that is, a portion where vibrations are suppressed by the support strut 140. Accordingly, vibrations of the flattened portion 126a and noises brought about by the vibrations of the flattened portion 126a can be effectively suppressed by the support strut 140 and the vibration damping materials 251, 252, 253 while suppressing an amount of vibration damping materials.

(7) Third Embodiment

In the second embodiment, the vibration damping material is applied only to the portions where a wall thickness is made small. However, the vibration damping material may be additionally applied to other portions. That is, the vibration damping material may be applied to the whole region of the bent portion 124 and the whole region of the flattened portion 126a other than the vibration damping material adhering regions, or the vibration damping material may be added to portions of regions other than the vibration damping material adhering regions (regions where a wall thickness is made small), for example, only the flattened portion 126a.

Figure 17:
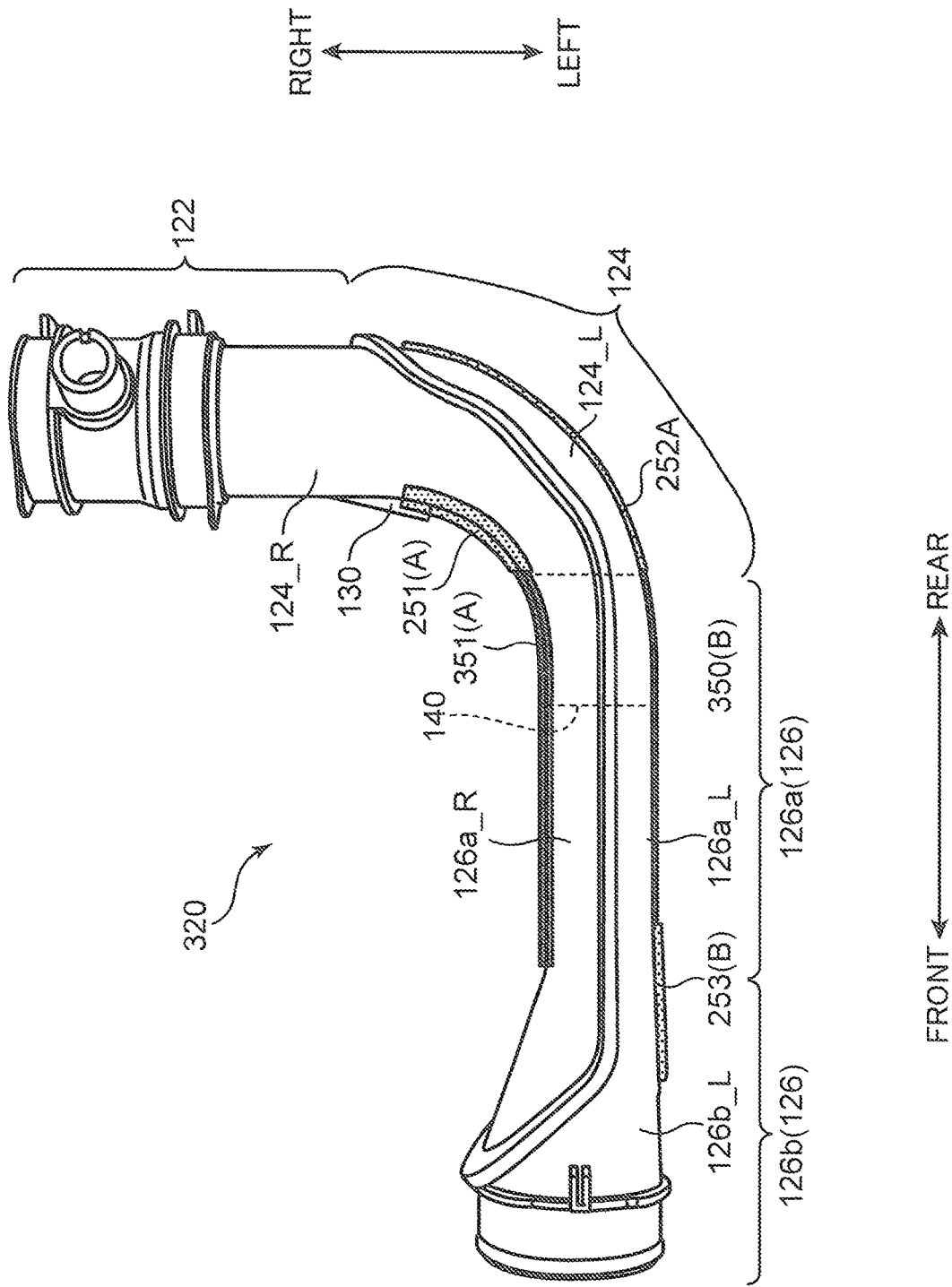
FIG. 17 is a top plan view of an air pipe according to a third embodiment.

FIG. 17 is a plan view of an air pipe 320 according to a third embodiment. FIG. 17 shows a case where a vibration damping material is adhered to approximately the whole region of a bent portion 124 and approximately the whole region of a flattened portion 126a.

As shown in FIG. 17, in the third embodiment, in the same manner as the first embodiment, the vibration damping material is adhered to approximately the whole region (except for an upper edge portion and a lower edge portion)

of the bent portion 124 and approximately the whole region (except for an upper edge portion and a lower edge portion) of the flattened portion 126a. However, as shown in FIG. 17, in the third embodiment, a thickness of vibration damping materials 350, 351 adhered to a region B other than the vibration damping material adhering region (region where the wall thickness is made small) A according to the second embodiment are suppressed small (for example, approximately half of the thickness of vibration damping material adhered to the region A).

That is, as described above, by making the wall thickness of the vibration damping material adhering region A including a left outer side surface 124_1 of the bent portion 124 small and by adhering the vibration damping material to the region A, vibrations and noises generated in the region A can be effectively suppressed. Accordingly, in the third embodiment, the vibration damping materials 350, 351 applied to regions other than the vibration damping material adhering regions (the regions where the wall thickness is made small) A are formed using a vibration damping material which is made of the same material as the vibration damping materials 251, 252, 253 adhered to the vibration damping material adhering regions (the regions where the wall thickness is made small) A and has the smaller thickness than the vibration damping materials 251, 252, 253 thus having a lower vibration suppressing ability.

With such a configuration, in the third embodiment, the vibration damping materials can be applied to the air pipe 320 in a wider range and hence, vibrations of the air pipe 320 and noises generated brought about by the vibrations of the air pipe 320 can be suppressed with more certainty and, at the same time, it is possible to suppress that a cost of the vibration damping material is excessively increased.

"Vibration suppressing ability" means vibration energy absorption ability of the vibration damping material. As the vibration damping material disposed on a portion other than the vibration damping material adhering region (the region where the wall thickness is made small), besides the vibration damping material which is made of the same material as the vibration damping material applied to the vibration damping material adhering region and has the smaller thickness as described previously, it is possible to use a vibration damping material which is made of a material having lower vibration energy absorption ability than the vibration damping material applied to the vibration damping material adhering region.

(8) Another Modification

In the embodiments described above, the description has been made with respect to the case where both the support strut 140 and the vibration damping materials 151, 152 (251, 252, 253) are disposed on the air pipe 120 (220). However, a configuration where only one of the support strut 140 and the vibration damping materials 151, 152 (251, 252, 253) is disposed on the air pipe 120 (220) may be adopted.

It is sufficient that the support strut 140 is disposed on at least a part of a portion formed of the bent portion 124 and the flattened portion 126a. For example, the support strut 140 may be disposed on the flattened portion 126a in a region ranging from a downstream end to an upstream side of the flattened portion 126a. Further, a specific shape of the support strut 140 is not limited to the shape described above. However, by forming the upstream end portion 140a and the downstream end portion 140b of the support strut 140 into a tapered shape as described previously, an intake air sound and an intake air resistance can be further decreased.

The vibration damping material adhering regions are not limited to the regions described above. However, a pressure wave which propagates to an upstream side from the upstream-side connecting portion 60a of the bypass passage 60 particularly impinges on the side wall 124_L on the outer peripheral side of the bent portion 124. Accordingly, by adhering the vibration damping material, particularly, a vibration damping material having relatively high vibration suppressing ability to at least a portion of the surface of the side wall 124_L on the outer peripheral side of the bent portion 124, vibrations and noises can be effectively suppressed.

As in the case of the second embodiment, when the vibration damping material is applied only to parts of the portion formed of the bent portion 124 and the flattened portion 126a, a wall thickness of such parts may be set equal to the thickness of other portions. However, in the case where the wall thickness of the vibration damping material adhering portion is made small, vibrations of such portions can be accelerated so that an energy of a pressure wave can be absorbed and, at the same time, the propagation of such vibrations can be suppressed by the vibration damping material and hence, more effectively and noises can be suppressed.

As has been described heretofore, the air intake device of an engine with a supercharger of the present invention includes the engine body, the air intake passage which introduces intake air into the engine body, and the turbo supercharger which includes the compressor disposed in the air intake passage and supercharges the intake air, this air intake device further including the bypass passage which makes the portion of the air intake passage on an upstream side of the compressor and the portion of the air intake passage on a downstream side of the compressor communicate with each other thus bypassing the compressor, and the bypass passage open/close valve which opens or closes the bypass passage, wherein the air intake passage has the upstream-side pipe positioned upstream of the compressor, the upstream-side pipe includes the first passage extending toward an upstream side from the compressor along a first direction, the bent portion bent from the upstream end of the first passage in the second direction, which differs from the first direction, and the second passage extending from the upstream end of the bent portion along the second direction, the bypass passage is connected to the connecting portion mounted in the first passage, the second passage has a vertically elongated cross-sectional shape where a size of the second passage in the vertical direction is larger than a size of the second passage in the width direction, and the vibration suppressing part for suppressing vibrations of the second passage is mounted in at least one of the bent portion and the second passage.

According to the present invention, by providing the bypass passage which bypasses the compressor and the bypass passage open/close valve to the air intake device, it is possible to suppress the increase of noises caused by the bypass passage while suppressing a damage or the like on the compressor and disposing the air intake passage in a compact manner.

To be more specific, in the present invention, the first passage, the bent portion and the second passage are disposed in the upstream side pipe extending toward an upstream side from the compressor, and the air intake passage extends in the first direction from the compressor and, subsequently, is bent and extends in the second direction. Further, the size of the second passage in the width direction is set shorter than the size of the second passage in the vertical direction. Accordingly, it is possible to prevent the intake passage from being elongated in the first direction and, at the same time, the size of a portion (second passage) of the air intake passage in the horizontal direction can be suppressed to a short size whereby the air intake passage can be arranged around the engine in a compact manner.

However, when the second passage is formed into a vertically elongated cross-sectional shape where the size of the second passage in the width direction becomes shorter than the size of the second passage in the vertical direction, there is a possibility that vibrations of the second passage is increased due to a pressure wave propagated to the second passage from the bypass passage so that noises are increased. To be more specific, the pressure wave propagated toward the upstream side from the bypass passage impinges on the bent portion and vibrates the bent portion, and along with such vibrations, both side walls of the second passage in the width direction vibrate and cause noises. On the other hand, according to the present invention, the vibration damping portion is formed on at least one of the bent portion and the second passage and hence, it is possible to suppress the vibrations of the second passage while allowing the second passage to have the shape.

In the present invention, it is preferable that the vibration suppressing part be disposed in the second passage.

With such a configuration, it is possible to suppress the vibrations of the second passage and noises brought about by such vibrations with more certainty.

In the present invention, it is preferable that, as the vibration suppressing part, a vibration suppressing support strut which connects a side wall of the second passage on one side in a width direction and a side wall of the second passage on the other side in the width direction to each other be disposed in the inner space of the second passage described above.

With such a configuration, it is possible to suppress the vibrations of both side walls of the second passage in the width direction and noises brought about by such vibrations with the simple configuration.

In the present invention, it is preferable that the vibration suppressing support strut have a shape extending in a upstream and downstream direction, an upstream end portion of the vibration suppressing support strut have a shape where a thickness of the upstream end portion is decreased gradually toward an upstream side, and a downstream end portion of the vibration suppressing support strut have a shape where a thickness of the downstream end portion is decreased gradually toward a downstream side.

With such a configuration, the flow of intake air around the vibration suppressing support strut can be made smooth so that the increase of an intake air sound can be suppressed.

In the present invention, it is preferable that the air intake device further include a resonator in which a space which communicates with an inner space of the air intake passage is formed, and the resonator communicate with a portion of the air intake passage disposed between the connecting portion and the vibration suppressing support strut.

With such a configuration, a sound transmitted to the second passage can be suppressed small by the resonator and hence, noises generated by the second passage can be decreased small with more certainty.

In the present invention, it is preferable that the air intake device further include a vibration damping material which is fixed to a surface of at least one of the second passage and the bent portion and be configured to function as the vibration suppressing part by absorbing vibrations of the surface.

With such a configuration, with the simple configuration where the vibration damping material is fixed to the surface of at least one of the second passage and the bent portion, the vibrations of the second passage and/or the vibrations of the bent portion and noises brought about by such vibrations can be suppressed small.

In the present invention, a wall thickness of the upstream-side pipe may be set such that the wall thickness of a specified portion which includes at least a portion of a side wall of the bent portion on an outer peripheral side having a small curvature is smaller than wall thicknesses of other portions, and the vibration damping material may be disposed on the surface of the specified portion.

With such a configuration, noises can be effectively suppressed small. To be more specific, in such a configuration, at least a part of the portion of the side wall of the bent portion on an outer peripheral side having a small curvature on which a pressure wave propagated from the bypass passage impinges is made to have small wall thickness. Accordingly, vibrations of the part is accelerated so that energy of the pressure wave can be effectively absorbed by the part. Further, the vibration damping material is disposed on the part and hence, it is possible to effectively suppress the propagation of the vibrations toward a further upstream side at such a part.

In the present invention, it is preferable that the vibration damping material having a smaller vibration suppressing ability than the vibration damping material disposed on the surface of the specified portion be disposed on at least a portion of a surface of the upstream side pipe except for the specified portion.

With such a configuration, while effectively suppressing noises at the specified portion as described above, it is possible to suppress vibrations and noises brought about by the vibrations in other portions by the vibration damping material and hence, noises brought about by the vibrations can be made small with more certainty. Further, with such a configuration, the member having small vibration suppressing ability is used as the vibration damping material disposed on the portion other than the specified portion. Accordingly, while suppressing noises with more certainty, it is possible to suppress the excessive increase of a cost which is brought about by the increase of a region where the vibration damping material is disposed.

Vibration suppressing ability of the vibration damping material means a vibration energy absorbing ability of the vibration damping material. As the vibration damping material disposed on the portions other than the specified portion, a vibration damping material made of the same material as the vibration damping material disposed on the specified portion and having a small thickness or a vibration damping material made of a material having low vibration energy absorbing ability may be named In the present invention, it is preferable that the specified portion be set in a region of the upstream-side pipe other than a portion of the upstream-side pipe where the vibration suppressing support strut connects the side wall of the second passage on one side in the width direction and the side wall of the second passage on the other side in the width direction to each other is disposed in the inner space of the second passage.

With such a configuration, it is possible to effectively suppress the vibrations of the upstream-side pipe and noises brought about by such vibrations by the vibration damping material and the vibration suppressing support strut while suppressing an amount of the vibration damping material small.

In the present invention, the vibration damping material may be disposed on at least one of an outer side surface of the second passage on one side in the width direction and an outer side surface of the second passage on the other side in the width direction.

With such a configuration, it is possible to more effectively suppress the vibrations of the second passage.

REFERENCE SIGNS LIST

10 Engine body
20 Air intake device
30 Air intake passage
50 Turbo supercharger
52 Compressor
60 Bypass passage
60a Connecting portion (upstream side connecting portion)
62 ABV (bypass passage open/close valve)
122 First straight portion (first passage)
124 Bent portion
126a Flattened portion (second passage)

The invention claimed is:

1. An air intake device of an engine, the engine comprising:
an engine body;
an air intake passage which introduces intake air into the engine body; and
a supercharger which includes a compressor disposed in the air intake passage and supercharges the intake air, the air intake device comprising:
a bypass passage which makes a portion of the air intake passage on an upstream side of the compressor and a portion of the air intake passage on a downstream side of the compressor communicate with each other thus bypassing the compressor; and
a bypass passage open/close valve which opens or closes the bypass passage, wherein
the air intake passage has an upstream-side pipe positioned upstream of the compressor,
the upstream-side pipe includes a first passage extending toward an upstream side from the compressor along a first direction, a bent portion bent from an upstream end of the first passage in a second direction, which differs from the first direction, and a second passage extending from an upstream end of the bent portion along the second direction,
the bypass passage is connected to a connecting portion mounted in the first passage,
the second passage has a vertically elongated cross-sectional shape where a size of the second passage in a vertical direction is larger than a size of the second passage in a width direction, and
a vibration suppressing support fin suppressing vibrations of the second passage is disposed in at least one of the bent portion of the air intake passage and the second passage of the air intake passage.

2. The air intake device of the engine with the supercharger according to claim 1, wherein the vibration suppressing support fin is disposed in the second passage.

3. The air intake device of the engine with the supercharger according to claim 2, wherein in an inner space of the second passage, the vibration suppressing support fin connects a side wall of the second passage on one side in a width direction and a side wall of the second passage on the other side in the width direction to each other.

4. The air intake device of the engine with the supercharger according to claim 3, wherein the vibration suppressing support fin has a shape extending in an upstream and downstream direction,
an upstream end portion of the vibration suppressing support fin has a shape where a thickness of the upstream end portion is decreased gradually toward an upstream side, and
a downstream end portion of the vibration suppressing support fin has a shape where a thickness of the downstream end portion is decreased gradually toward a downstream side.

5. The air intake device of the engine with the supercharger according to claim 4, further comprising a resonator in which a space which communicates with an inner space of the air intake passage is formed, wherein
the resonator communicates with a portion of the air intake passage disposed between the connecting portion and the vibration suppressing support fin.

6. The air intake device of the engine with the supercharger according to claim 5, further comprising a vibration damping material which is disposed on a surface of at least one of the second passage and the bent portion and is configured to function as the vibration suppressing support fin by absorbing vibrations of the surface.

7. The air intake device of the engine with the supercharger according to claim 6, wherein
a wall thickness of the upstream-side pipe is set such that the wall thickness of a specified portion which includes at least a portion of a side wall of the bent portion on an outer peripheral side having a small curvature is smaller than wall thicknesses of other portions, and
the vibration damping material is disposed on the surface of the specified portion.

8. The air intake device of the engine with the supercharger according to claim 7, wherein a vibration damping material having a smaller vibration suppressing ability than the vibration damping material disposed on the surface of the specified portion is disposed on at least a portion of a surface of the upstream-side pipe except for the specified portion.

9. The air intake device of the engine with the supercharger according to claim 8, wherein the specified portion is set in a region other than a portion of the upstream-side pipe where the vibration suppressing support fin connects the side wall of the second passage on one side in the width direction and the side wall of the second passage on the other side in the width direction to each other in the inner space of the second passage.

10. The air intake device of the engine with the supercharger according to claim 6, wherein the vibration damping material is disposed on at least one of an outer side surface of the second passage on one side in the width direction and an outer side surface of the second passage on the other side in the width direction.

11. The air intake device of the engine with the supercharger according to claim 1, wherein in an inner space of the second passage, as the vibration suppressing support fin, a vibration suppressing support fin which connects a side wall of the second passage on one side in a width direction and a side wall of the second passage on the other side in the width direction to each other is provided.

12. The air intake device of the engine with the supercharger according to claim 11, wherein
the vibration suppressing support fin has a shape extending in an upstream and downstream direction, an upstream end portion of the vibration suppressing support fin has a shape where a thickness of the upstream end portion is decreased gradually toward an upstream side, and a downstream end portion of the vibration suppressing support fin has a shape where a thickness of the downstream end portion is decreased gradually toward a downstream side.

13. The air intake device of the engine with the supercharger according to claim 12, further comprising a resonator in which a space which communicates with an inner space of the air intake passage is formed, wherein the resonator communicates with a portion of the air intake passage disposed between the connecting portion and the vibration suppressing support fin.

14. The air intake device of the engine with the supercharger according to claim 11, further comprising a resonator in which a space which communicates with an inner space of the air intake passage is formed, wherein the resonator communicates with a portion of the air intake passage disposed between the connecting portion and the vibration suppressing support fin.

15. The air intake device of the engine with the supercharger according to claim 1, further comprising a vibration damping material which is disposed on a surface of at least one of the second passage and the bent portion and is configured to function as the vibration suppressing support fin by absorbing vibrations of the surface.

16. An air intake device of an engine, the engine comprising:

an engine body;

an air intake passage which introduces intake air into the engine body; and a supercharger which includes a compressor disposed in the air intake passage and supercharges the intake air, the air intake device comprising:

a bypass passage which makes a portion of the air intake passage on an upstream side of the compressor and a portion of the air intake passage on a downstream side of the compressor communicate with each other thus bypassing the compressor; and a bypass passage open/close valve which opens or closes the bypass passage, wherein the air intake passage has an upstream-side pipe positioned upstream of the compressor, the upstream-side pipe includes a first passage extending toward an upstream side from the compressor along a first direction, a bent portion bent from an upstream end of the first passage in a second direction, which differs from the first direction, and a second passage extending from an upstream end of the bent portion along the second direction, the bypass passage is connected to a connecting portion mounted in the first passage, the second passage has a vertically elongated cross-sectional shape where a size of the second passage in a vertical direction is larger than a size of the second passage in a width direction, a vibration suppressing support fin suppressing vibrations of the second passage is disposed in at least one of the bent portion and the second passage, a vibration damping material which is disposed on a surface of at least one of the second passage and the bent portion and is configured to function as the vibration suppressing support fin by absorbing vibrations of the surface, a wall thickness of the upstream-side pipe is set such that the wall thickness of a specified portion which includes at least a portion of a side wall of the bent portion on an outer peripheral side having a small curvature is smaller than wall thicknesses of other portions, and the vibration damping material is disposed on the surface of the specified portion.

17. The air intake device of the engine with the supercharger according to claim 16, wherein a vibration damping material having a smaller vibration suppressing ability than the vibration damping material disposed on the surface of the specified portion is disposed on at least a portion of a surface of the upstream-side pipe except for the specified portion.

18. The air intake device of the engine with the supercharger according to claim 17, wherein the specified portion is set in a region other than a portion of the upstream-side pipe where a vibration suppressing support fin connects the side wall of the second passage on one side in the width direction and the side wall of the second passage on the other side in the width direction to each other in the inner space of the second passage.

19. The air intake device of the engine with the supercharger according to claim 16, wherein the specified portion is set in a region other than a portion of the upstream-side pipe where a vibration suppressing support fin connects the side wall of the second passage on one side in the width direction and the side wall of the second passage on the other side in the width direction to each other in the inner space of the second passage.

20. The air intake device of the engine with the supercharger according to claim 15, wherein the vibration damping material is disposed on at least one of an outer side surface of the second passage on one side in the width direction and an outer side surface of the second passage on the other side in the width direction.

* * * * *